US010819405B2

(12) United States Patent
Cai et al.

(10) Patent No.: US 10,819,405 B2
(45) Date of Patent: Oct. 27, 2020

(54) MITIGATING BEAM SQUINT IN MILLIMETER WAVE WIRELESS COMMUNICATION SYSTEMS

(71) Applicant: UNIVERSITY OF NOTRE DAME DU LAC, South Bend, IN (US)

(72) Inventors: Mingming Cai, Santa Clara, CA (US); J. Nicholas Laneman, Granger, IN (US); Bertrand Hochwald, South Bend, IN (US)

(73) Assignee: University of Notre Dame du Lac, South Bend, IN (US)

(*) Notice: Subject to any disclaimer, the term of this patent is extended or adjusted under 35 U.S.C. 154(b) by 0 days.

(21) Appl. No.: 16/209,254

(22) Filed: Dec. 4, 2018

(65) Prior Publication Data

US 2019/0173537 A1    Jun. 6, 2019

Related U.S. Application Data

(60) Provisional application No. 62/594,438, filed on Dec. 4, 2017.

(51) Int. Cl.
| | |
|---|---|
| H04B 7/0456 | (2017.01) |
| H01Q 21/06 | (2006.01) |
| H04W 16/28 | (2009.01) |
| H04B 7/06 | (2006.01) |
| H04B 7/0408 | (2017.01) |
| H04J 11/00 | (2006.01) |

(52) U.S. Cl.
CPC ......... *H04B 7/0465* (2013.01); *H01Q 21/061* (2013.01); *H04B 7/0408* (2013.01); *H04B 7/0608* (2013.01); *H04B 7/0617* (2013.01); *H04B 7/0663* (2013.01); *H04W 16/28* (2013.01); *H04J 2011/0009* (2013.01)

(58) Field of Classification Search
CPC .. H04B 7/0465; H04B 7/0408; H04B 7/0608; H04B 7/0617; H04B 7/0663; H01Q 21/061; H04W 16/28; H04J 2011/0009
See application file for complete search history.

(56) References Cited

U.S. PATENT DOCUMENTS 9,653,816 B2 *  5/2017  Ferreri ................. H01Q 21/061
9,838,125 B2 * 12/2017  Prucnal ............ H04B 10/25752
(Continued)

OTHER PUBLICATIONS

Cai ("Effect of Wideband Beam Squint on Codebook Design in Phased-Array", Sep. 22, 2016), (Year: 2016).*
(Continued)

*Primary Examiner* — Stephen J Clawson
(74) *Attorney, Agent, or Firm* — Greenberg Traurig, LLP

(57) ABSTRACT

A method for managing beam squint in a phased antenna array system operating at millimeter wavelengths using carrier aggregation includes determining a minimum array gain threshold, determining an upper bound for a fractional bandwidth for a fixed number of antennas, and constructing a codebook with a predetermined coverage range based on at least one of an angle of arrival or an angle of departure and further based on the upper bound. The method further includes performing carrier aggregation for the fixed number of antennas and selecting at least two antennas based on the codebook.

24 Claims, 25 Drawing Sheets

(56) References Cited

U.S. PATENT DOCUMENTS

| | | | | |
|---|---|---|---|---|
| 2012/0033759 | A1* | 2/2012 | Goransson | H04B 17/24 375/296 |
| 2012/0039342 | A1* | 2/2012 | Berggren | H04L 1/0073 370/474 |
| 2012/0263117 | A1* | 10/2012 | Love | H04W 72/1226 370/329 |
| 2014/0162642 | A1* | 6/2014 | Kwon | H04W 8/24 455/435.1 |
| 2017/0150480 | A1* | 5/2017 | Kim | H04W 72/02 |

OTHER PUBLICATIONS

E. Adabi Firouzjaei, "Mm-Wave Phase Shifters and Switches," PhD thesis, EECS Department, University of California, Berkeley, Dec. 2010. URL http://www2.eecs.berkeley.edu/Pubs/TechRpts/2010/EECS-2010-163.html.
Alekseev et al., "New structure of ultrawideband fixed phase shifters based on stepped coupled transmission lines with stubs," Journal of Communications Technology and Electronics, 62(5):535-541, 2017.
Alkhateeb et al., "Compressed sensing based multi-user millimeter wave systems: How many measurements are needed?," In 2015 IEEE International Conference on Acoustics, Speech and Signal Processing (ICASSP), pp. 2909-2913. IEEE, 2015.
Au-Yeung et al., "On the performance of random vector quantization limited feedback beamforming in a miso system," IEEE Transactions on Wireless Communications, 6(2), 2007.
C. A. Balanis, Antenna theory: analysis and design. John Wiley & Sons, Hoboken, NJ, third edition, 2005.
Bogale et al., "On the number of RF chains and phase shifters, and scheduling design with hybrid analog-digital beamforming," IEEE Transactions on Wireless Communications, 15(5):3311-3326, 2016.
Bukhari et al., "A survey of channel bonding for wireless networks and guidelines of channel bonding for futuristic cognitive radio sensor networks," IEEE Communications Surveys & Tutorials, 18(2):924-948, 2016.
Cai et al., "Wideband distributed spectrum sharing with multichannel immediate multiple access," Analog Integrated Circuits and Signal Processing, 91(2):239-255, May 2017.
Cai et al., "Database- and sensing-based distributed spectrum sharing: Flexible physical-layer prototyping," In 2015 Asilomar Conference on Signals, Systems, and Computers, pp. 1051-1057, Monterey, CA, Nov. 2015.
Cai et al., "Effect of wideband beam squint on codebook design in phased-array wireless systems," In 2016 IEEE Global Communications Conference (GLOBECOM), Washington, DC, Dec. 2016. IEEE.
Cai et al., "Beamforming codebook compensation for beam squint with channel capacity constraint," In 2017 IEEE International Symposium on Information Theory (ISIT)., pp. 76-80, Aachen, Germany, Jun. 2017.
Capone et al., "Context information for fast cell discovery in mm-wave 5g networks," In 21th European Wireless Conference, pp. 1-6. VDE, 2015.
Cisco Systems Inc. Cisco visual networking index: Global mobile data traffic forecast update, 2016-2021 white paper, Mar. 2017. URL http://www.cisco.com/c/en/us/solutions/collateral/service-provider/visual-networking-index-vni/mobile-white-paper-c11-520862.html.
Cormen et al., Introduction to Algorithms. MIT Press, Cambridge, MA, third edition, 2009.
T.M. Cover and J.A. Thomas, Elements of information theory. John Wiley & Sons, Hoboken, New Jersey, second edition, 2006.
Desai et al., "Initial beamforming for mmwave communications," In 2014 48th Asilomar Conference on Signals, Systems and Computers, pp. 1926-1930. IEEE, 2014.
Dong et al., "Linear interpolation in pilot symbol assisted channel estimation for ofdm," IEEE transactions on Wireless Communications, 6(5):1910-1920, 2007.

El Ayach et al., "Spatially sparse precoding in millimeter wave MIMO systems," IEEE transactions on Wireless Communications, 13(3):1499-1513, 2014.
Federal Communications Commission. Report and order and second further notice of proposed rulemaking, Apr. 2015. URL https://apps.fcc.gov/edocs_public/attachmatch/FCC-15-47A1.pdf.
Frankel et al., "Array transmitter/receiver controlled by a true time-delay fiber-optic beamformer," IEEE Photonics Technology Letters, 7(10):1216-1218, 1995.
Giordani et al., "Initial access in 5G mmwave cellular networks," IEEE Communications Magazine, 54(11):40-47, 2016.
Goldsmith et al., "Breaking spectrum gridlock with cognitive radios: an information theoretic perspective," Proceedings of the IEEE, 97(5):894-914, Apr. 2009.
Han et al., "Two-stage compressed sensing for millimeter wave channel estimation," In 2016 IEEE International Symposium on Information Theory (ISIT), pp. 860-864. IEEE, 2016.
Hassibi et al., "How much training is needed in multiple-antenna wireless links?," IEEE Transactions on Information Theory, 49(4):951-963, 2003.
Heath et al., "An overview of signal processing techniques for millimeter wave MIMO systems," IEEE Journal of Selected Topics in Signal Processing, 10:436-453, 2016.
Huang et al., "Joint channel estimation and beamforming for millimeter wave cellular system," In IEEE Global Communications Conference (GLOBECOM), pp. 1-6, 2015.
Hur et al., "Millimeter wave beamforming for wireless backhaul and access in small cell networks," IEEE Transactions on Communications, 61(10):4391-4403, 2013.
Jeong et al., "Random access in millimeter-wave beamforming cellular networks: issues and approaches," IEEE Communications Magazine, 53 (1):180-185, 2015.
Garakoui et al., "Phased-array antenna beam squinting related to frequency dependence of delay circuits," In 41th European Microwave Conference, Manchester, UK, Oct. 2011.
Kim et al., "A DC-to-40 GHz four-bit RF MEMS true-time delay network," IEEE Microwave and Wireless Components Letters, 11(2):56-58, 2001.
Koul et al., "RF MEMS true-time-delay phase shifter," In Micro and Smart Devices and Systems, pp. 467-485. Springer, 2014.
J. Lee, "RF photonics for beamforming and array applications," Technical report, DTIC Document, 2003.
H. J. Liebe, "MPM-an atmospheric millimeter-wave propagation model," International Journal of Infrared and Millimeter Waves, 10(6):631-650, 1989.
Liu et al., "Minimize beam squint solutions for 60 GHz millimeter-wave communication system," In IEEE 78th Vehicular Technology Conference (VTC 2013—Fall), pp. 1-5. IEEE, 2013.
M. Longbrake, "True time-delay beamsteering for radar," In 2012 IEEE National Aerospace and Electronics Conference (NAECON), pp. 246-249. IEEE, 2012.
R. J. Mailloux, Phased array antenna handbook. Artech House, Norwood, MA, second edition, 2005.
Matthews et al., "A wide-band fiber-optic true-time-steered array receiver capable of multiple independent simultaneous beams," IEEE Photonics Technology Letters, 10(5):722-724, 1998.
Mendez-Rial, et al., "Hybrid MIMO architectures for millimeter wave communications: Phase shifters or switches?," IEEE Access, 4, 2016.
Morelli et al., "A comparison of pilot-aided channel estimation methods for ofdm systems," IEEE Transactions on Signal Processing, 49(12):3065-3073, 2001.
National Spectrum Consortium. About NSC, Nov. 2015. URL http://www.nationalspectrumconsortium.org/#about.
T. Needham, "A visual explanation of jensen's inequality," The American Mathematical Monthly, 100(8):768-771, 1993.
S. J. Orfanidis, Electromagnetic waves and antennas. Rutgers University, New Brunswick, NJ, 2002.
Park et al., "A beamforming codebook restriction for cross-tier interference coordination in two-tier femtocell networks," IEEE Transactions on Vehicular Technology, 60(4):1651-1663, 2011.
President's Council of Advisors on Science and Technology (PCAST). Realizing the full potential of government-held spectrum to spur

(56) References Cited

OTHER PUBLICATIONS economic growth. Report to the president, White House Office of Science and Technology Policy (OSTP), Jul. 2012.
Rangan et al., "Millimeter-wave cellular wireless networks: potentials and challenges," Proceedings of the IEEE, 102 (3):366-385, 2014.
http://www.antenna.theory.com/basics/friis.php, Nov. 27, 2017.
Roh et al, "Millimeter-wave beamforming as an enabling technology for 5G cellular communications: theoretical feasibility and prototype results," IEEE Communications Magazine, 52(2):106-113, 2014.
Rotman et al., "True time delay in phased arrays," Proceedings of the IEEE, 104(3):504-518, 2016.
Samimi et al., "3-D millimeter-wave statistical channel model for 5G wireless system design," IEEE Transactions on Microwave Theory and Techniques, 64(7):2207-2225, 2016.
Sayeed et al., "Wireless communication and sensing in multipath environments using multi-antenna transceivers," Handbook on Array Processing and Sensor Networks, 2010.
Song et al., "Codebook design for hybrid beamforming in millimeter wave systems," In Proceedings of 2015 IEEE International Conference on Communications (ICC), pp. 1298-1303. IEEE, 2015.
Sun et al., "Performance metrics, sampling schemes, and detection algorithms for wideband spectrum sensing," IEEE Transactions on Signal Processing, 62(19):5107-5118, Oct. 2014.
Tse et al., Fundamentals of wireless communication, Cambridge University Press, 2005.
Venkateswaran et al., "Analog beamforming in MIMO communications with phase shift networks and online channel estimation," IEEE Transactions on Signal Processing, 58(8):4131-4143, 2010.
Wang et al., "Performance analysis of downlink interband carrier aggregation in lte-advanced," In 2011 IEEE Vehicular Technology Conference (VTC 2011—Fall), pp. 1-5. IEEE, 2011.
Wang et al., "Beamforming codebook design and performance evaluation for 60 GHz wideband WPANs," In Proceedings of 2009 IEEE 70th Vehicular Technology Conference (VTC 2009—Fall), pp. 1-6. IEEE, 2009.
Willms et al., "A wideband gaas 6-bit true-time delay mmic employing on-chip digital drivers," In 30th European Microwave Conference, pp. 1-4. IEEE, 2000.
Xiao et al., "Hierarchical codebook design for beam-forming training in millimeter-wave communication," IEEE Transactions on Wireless Communications, 15(5):3380-3392, 2016.
Younis et al., "Digital beamforming in sar systems," IEEE Transactions on Geoscience and Remote Sensing, 41(7):1735-1739, 2003.
Zhao et al., "A survey of dynamic spectrum access," IEEE Signal Processing Magazine, 24:79-89, May 2007.
Zwick et al., "Wideband channel sounder with measurements and model for the 60 GHz indoor radio channel," IEEE Transactions on Vehicular Technology, 54(4):1266-1277, 2005.

\* cited by examiner

TABLE 7.1: SUMMARY OF CODEBOOK PARAMETERS

| M | | $\psi_{i,F}$ | $\psi_{i,l}$ | $\psi_{i,r}$ |
|---|---|---|---|---|
| ODD | $i > \frac{M+1}{2}$ | $\frac{2\psi_d}{b}\left[1-\left(\frac{2-b}{2+b}\right)^{i-\frac{M+1}{2}}\right]$ | $\frac{2\psi_d}{b}\left[1-\frac{2}{2+b}\left(\frac{2-b}{2+b}\right)^{i-\frac{M+1}{2}}\right]$ | $\frac{2\psi_d}{b}\left[1-\frac{2}{2+b}\left(\frac{2-b}{2+b}\right)^{i-\frac{M+1}{2}}\right]$ |
| ODD | $i = \frac{M+1}{2}$ | $0$ | $-\frac{2\psi_d}{2+b}$ | $\frac{2\psi_d}{2+b}$ |
| ODD | $i < \frac{M+1}{2}$ | $-\frac{2\psi_d}{b}\left[1-\left(\frac{2-b}{2+b}\right)^{\frac{M+1}{2}-i}\right]$ | $-\frac{2\psi_d}{b}\left[1-\frac{2}{2-b}\left(\frac{2-b}{2+b}\right)^{\frac{M+1}{2}-i}\right]$ | $-\frac{2\psi_d}{b}\left[1-\frac{2}{2+b}\left(\frac{2-b}{2+b}\right)^{\frac{M+1}{2}-i}\right]$ |
| EVEN | $i > \frac{M}{2}$ | $\frac{2\psi_d}{b}\left[1-\frac{2-b}{2}\left(\frac{2-b}{2+b}\right)^{i-\frac{M}{2}-1}\right]$ | $\frac{2\psi_d}{b}\left[1-\left(\frac{2-b}{2+b}\right)^{i-\frac{M}{2}-1}\right]$ | $\frac{2\psi_d}{b}\left[1-\left(\frac{2-b}{2+b}\right)^{i-\frac{M+1}{2}}\right]$ |
| EVEN | $i \le \frac{M}{2}$ | $-\frac{2\psi_d}{b}\left[1-\frac{2-b}{2}\left(\frac{2-b}{2+b}\right)^{\frac{M}{2}-i}\right]$ | $-\frac{2\psi_d}{b}\left[1-\left(\frac{2-b}{2+b}\right)^{\frac{M}{2}-i+1}\right]$ | $-\frac{2\psi_d}{b}\left[1-\left(\frac{2-b}{2+b}\right)^{\frac{M}{2}-i}\right]$ |

FIG. 18

Algorithm 2 Codebook Design with Beam Squint
---
1: Calculate $\psi_t$ based on (7.32) given $g_t$
2: Calculate the minimum codebook size $M_{min}$ with Theorem 6
3: Calculate $\psi_d$ by putting $M_{min}$ into (7.29)
4: Align the beams according to the beam parameters in Table 7.1

FIG. 19

MITIGATING BEAM SQUINT IN MILLIMETER WAVE WIRELESS COMMUNICATION SYSTEMS

CROSS-REFERENCE TO RELATED APPLICATION

This application claims priority to U.S. Provisional Patent Application No. 62/594,438, filed on Dec. 4, 2017, which is hereby incorporated by reference in its entirety.

FIELD

The present disclosure relates generally to wireless communication systems, and more particularly to mitigating beam squint in millimeter wave wireless communication systems.

BACKGROUND

Wireless communication devices have become smaller and more powerful as well as more capable. Increasingly, users rely on wireless communication devices for mobile phone use as well as email and Internet access. Devices such as cellular telephones, personal digital assistants (PDAs), laptop computers, and other similar devices provide reliable service with expanded coverage areas. Such devices may be referred to as mobile stations, stations, access terminals, user terminals, subscriber units, user equipment, and similar terms.

As wireless communication has gained in use and popularity there has been increasing demand for radio spectrum with the rapid deployment of new wireless technologies. The new 5G next generation cellular communication system demands GHz of spectrum while the spectrum below 6 GHz alone is not capable of meeting these requirements.

BRIEF DESCRIPTION OF THE DRAWINGS

FIG. 18 provides a table of codebook parameters, in accordance with various examples.

FIG. 19 provides an example of a codebook algorithm design with beam squint, in accordance with various examples.

DETAILED DESCRIPTION

Figure 1:
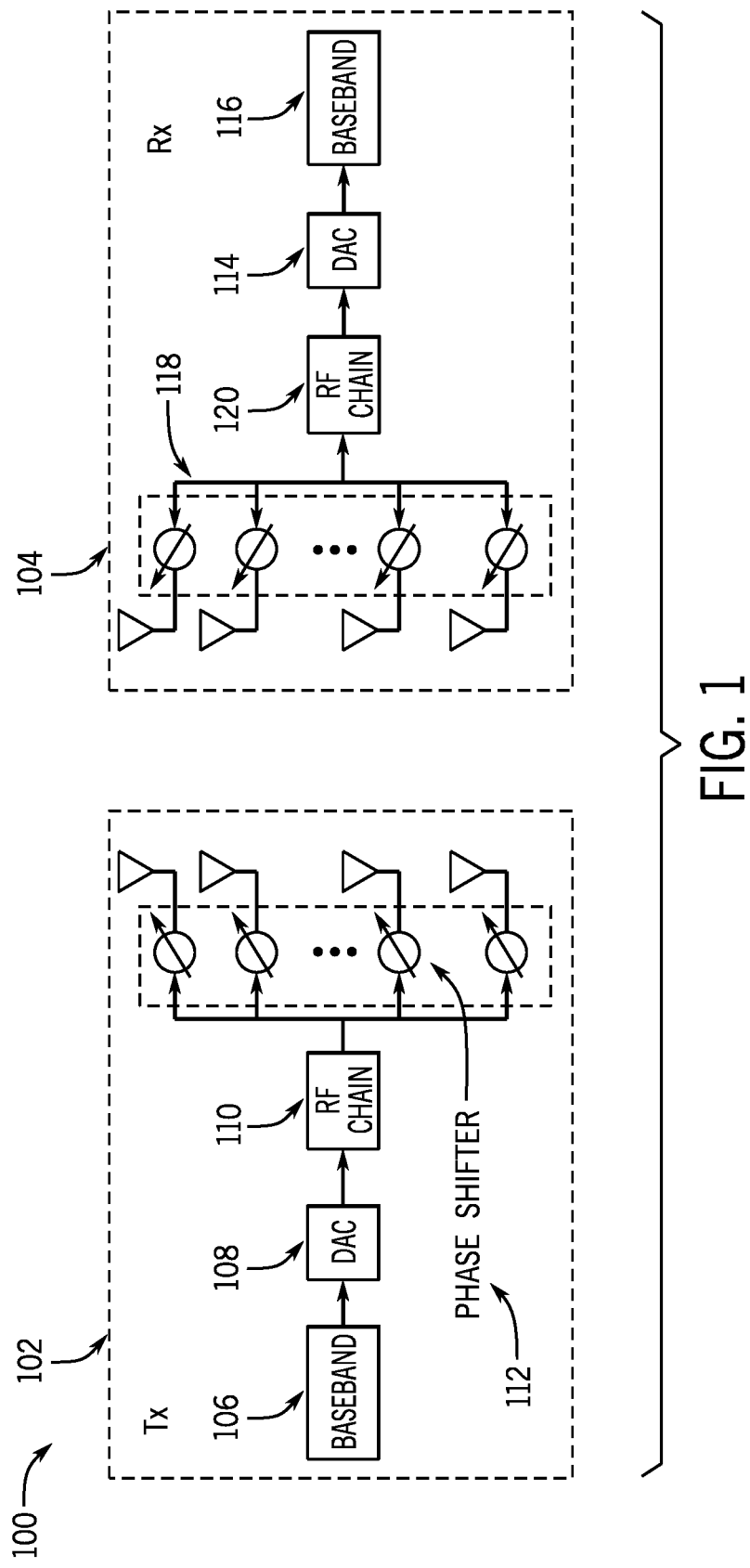
FIG. 1 illustrates the architecture of analog beamforming, in accordance with various examples.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

As used in this application, the terms "component," "module," "system," and the like are intended to refer to a computer-related entity or electronics related entity, either hardware, firmware, a combination of hardware and software, software, or software in execution. For example, a component may be, but is not limited to being, a process running on a processor, an integrated circuit, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

Furthermore, various aspects are described herein in connection with an access terminal and/or an access point. An access terminal may refer to a device providing voice and/or data connectivity to a user. An access wireless terminal may be connected to a computing device such as a laptop computer or desktop computer, or it may be a self-contained device such as a cellular telephone. An access terminal can also be called a system, a subscriber unit, a subscriber station, mobile station, mobile, remote station, remote terminal, a wireless access point, wireless terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. An access point, otherwise referred to as a base station or base station controller (BSC), may refer to a device in an access network that communicates over the air-interface, through one or more sectors, with wireless terminals. The access point may act as a router between the wireless terminal and the rest of the access network, which may include an Internet Protocol (IP) network, by converting received air-interface frames to IP packets. The access point also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ), and integrated circuits such as read-only memories, programmable read-only memories, and electrically erasable programmable read-only memories.

Various aspects will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Other aspects, as well as features and advantages of various aspects, of the present invention will become apparent to those of skill in the art through consideration of the ensuring description, the accompanying drawings and the appended claims.

Examples described herein provide methods, apparatuses, systems, computer readable mediums, etc. to compensate for beam squint in a phased array antenna. A first example provides carrier aggregation for phased array analog beamforming to improve system throughput. At mmWave wavelengths, multiple non-contiguous bands or carriers may be aggregated to provide more spectrum and higher channel capacity. For carrier aggregation in the mmWave bands, beam squint should be taken into account because larger bandwidth and/or frequency band separation increases the effects of beam squint. Beam focus angles may be determined to maximize the total channel capacity. In particular, the carrier aggregation for the case of two bands may be used to provide the design criterion to determine when the beam should focus on the center of the two bands and when the beam should focus on only one of the bands.

A further example provides a beamforming codebook with a channel capacity constraint. Codebook size increases as bandwidth or the number of antennas in the array increases, and the beam squint limits the bandwidth given the number of antennas in the array. In switched beamforming, a codebook may be designed to provide minimum channel capacity at the cost of increased codebook size. Codebook size increases with increasing numbers of antennas or the bandwidth growing.

A further example provides a beamforming codebook with a minimum gain array constraint that compensates for the beam squint. This further example compensates for the beam squint with a minimum threshold of array gain for a desired coverage angle range and for all frequencies in the wideband system. The codewords of this codebook may be further optimized to increase the minimum array gain of the codebook. In addition, this example provides design criteria that limit the bandwidth or the number of antennas of the array if the other variable is fixed.

The various examples described herein provide solutions for utilizing spectrum at higher frequencies, i.e., millimeter wave (mmWave bands). At mmWave frequencies, analog beamforming with phased arrays shows promise as a suitable technique for 5G wireless systems. However, the gain provided by the phased array is frequency dependent in the wideband system, an effect known as beam squint.

In a phased array or slotted waveguide antenna, beam squint refers to the angle that the beam direction is offset from the target angle of departure (angle of arrival) of the transmit (receive) antenna. In simple terms, it is the change in the beam direction as a function of the operation frequency, polarization, or orientation. Beam squint can limit the bandwidth in phased array antenna systems and may affect both uniform linear arrays (ULA) and uniform planar arrays (UPA). As bandwidth increases, beam squint increases. This beam squint decreases channel capacity, so path selection should take beam squint into consideration. Current channel estimation algorithms do not take beam squint into account and channel estimation error is increased by the beam squint, further decreasing channel capacity There is a need in the art to maximize channel capacity and reduce the effects of beam squint in phased array antennas used in wireless communication systems.

FIG. 1 illustrates the architecture of analog beamforming. Analog beamforming is implemented by phased antenna arrays, such as that shown in system 100. A transmit side 102 incorporates a baseband 106, a digital-to-analog converter (DAC) 108, and a radio frequency (RF) chain 110. The RF chain 110 consists of a frequency upconverter, power amplifier, and so forth. This RF chain 110 feeds into phase shifters 112. The phase shifters 112 may be controlled digitally. In a similar fashion, a receive side 104 also incorporates a baseband element 116, an analog-to-digital converter (ADC) 114, and an RF chain 120, in communication with a phased array 118. The transmitted signal may be constructive in some directions and destructive in other directions, forming a beam. The weights of phase shifters 112 and/or 118 may be dynamically adjusted based on desired beam steering strategies. Analog beamforming may be constrained by the phase shifters 112 and/or 118. Analog beamforming may be preferred for mobile mmWave application because it offers low cost and low complexity.

Beamforming may be divided into two types: continuous beamforming and switched beamforming. In continuous beamforming, beams may be adjusted continuously in space. In contrast, the beams in switched beamforming may only be adjusted to focus on a finite set of angles. To cover a desired range of angle of arrival (AoA) and angle of departure (AoD) in space, a beamforming codebook may be used in switched beamforming. A beamforming codebook consists of multiple beams with each beam determined by a set of beamforming phrases. Each beam is a codeword of the codebook. The transmitter or receiver may only use one beam in its codebook at a time. To achieve a high array gain for the carrier frequency and a given beam focus angle, the phase shifters may obey certain relationships; for example, in a uniform linear array, the phases may follow the equation given below:

$$\beta_n(\theta_p)=2\pi c^{-1}f_c(n-1)d\sin\theta_F, n=1,2,\ldots,N,$$

where $\theta_F$ is the beam focus angle, d is the antenna spacing, fc is the carrier frequency, and c is the speed of light. This is referred to herein as a fine beam.

To eliminate beam squint, true time-delay (TTD) devices may be applied to delay signals by time, which corresponds to a certain linear phase response in the frequency domain, instead of phase shifters, which corresponds to a constant phase response for all frequencies. There are two methods used to implement TTD: optical and electronic.

In optical methods, RF signals may be modulated into optical signals and those optical signals are delayed by long optical fibers to introduce time delay. The optical signals may ultimately be demodulated into RF signals. Different delays may be produced by combining multiple optical fibers and combination algorithms. Optical TTD has the disadvantage of poor RF performance of the modulator and detector. Large size and high cost make this less desirable and feasible for mobile applications.

Electronic methods may also be used, including for example micro-electro-mechanical systems (MEMS) and monolithic microwave integrated circuits (MMICs). The weight of the TTD with coaxial cable is excessive for mobile applications and MEMS TTD uses MEMS switches to combine the fabricated delay line on chip. While the insertion loss may be relatively small, it may fail with high power signals, potentially making it unsuitable for mobile application.

Figure 2:
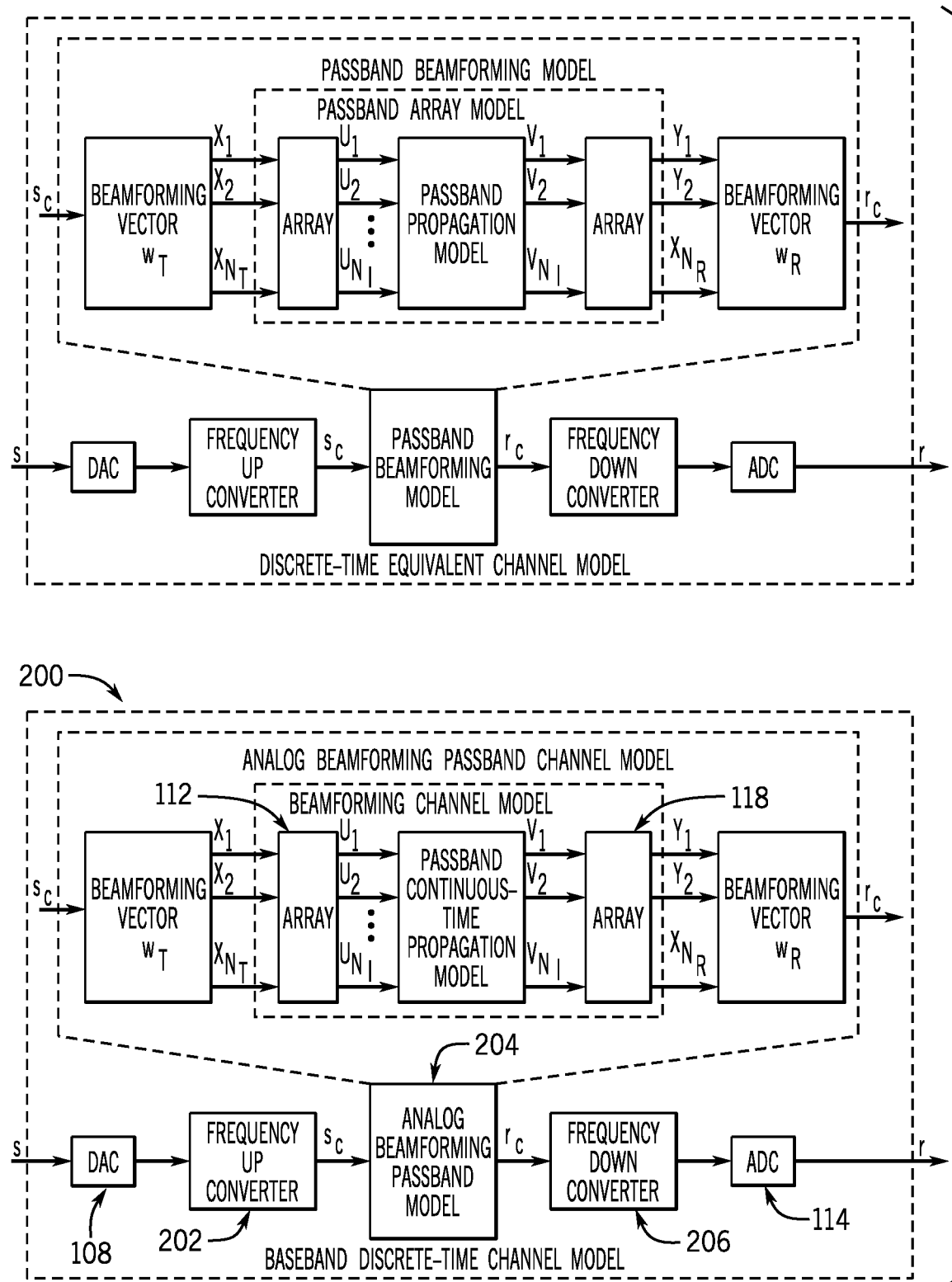
FIG. 2 illustrates passband channel models, in accordance with various examples.

FIG. 2 illustrates passband beamforming models. Various examples herein include four nested channel models for analog beam-forming based on different encapsulated components. These channel models may include three continuous-time models, namely, a passband propagation model, a pass-band array model, and a passband beamforming model, as well as one discrete-time equivalent channel model at baseband. The three continuous-time models may also be known as: an analog beamforming passband channel model; a beamforming channel model; and a passband continuous-time propagation model.

In FIG. 2, the signal of channel models 200 is first input to the DAC 108 and frequency upconverter 202. The frequency upconverter 202 provides input to the analog beamforming channel 204. This analog beamforming channel sends the signal to the frequency downconverter 206, which passes it to the ADC 114. Analog beamforming passband channel 204 includes a beamforming vector $W_T$ which is input to phased array 112 on the transmit side. Phased array 118 forms a part of the beamforming channel model which may include the passband continuous-time propagation model. This model provides input to the phase array 118, which outputs a beamforming vector $W_R$ on the receive side.

Propagation characteristics of mmWave signals are unique due to their relatively small wavelength compared to objects in the environment. Friis' Law indicates that the signal attenuation is proportional to the square of frequency in free space. As a result, a signal at mmWave experiences much higher loss than does a signal below 6 GHz. This significant attenuation is a primary reason that beamforming may be used at mmWave frequencies.

The beamforming channel model describes the relation between the transmitted signal vector x(t) after phase shifters and the received signal vector y(t) before phase shifters. The arrays may be designed based on the carrier frequency.

In the analog beamforming passband channel model, phase shifters may be included in the channel model. The effect of the phase shifters may be modeled by the beamforming vector. In this model, the frequency dependent array response vectors and the frequency independent beamforming vectors introduce beam squint.

Baseband discrete-time channel models may use an orthogonal frequency-division multiplexing system. Due to the poor scattering nature of mmWave signals, the mmWave channel is sparse, with fewer signal paths when compared to microwave channels. When fine beams are used at both transmitter and receiver, most of the paths are filtered out by the two spatial filters. The baseband discrete-time channel model may be approximated as having one focused path with its corresponding gain and propagation delay.

When the radio of a mobile device is turned on, the transmitter and receiver may not know in which directions to focus their beams. Initial access is the process used by the transmitter and receiver arrays to find the appropriate beam focus angles. Selecting transmitter and receiver beams is akin to selecting the signal path for transmission. Path gain is often used as the performance metric, ignoring beam squint.

There are four types of initial access schemes: exhaustive search, hierarchical search, compressive sensing, and context information (CI) based search. In these initial access schemes, switched beamforming may be assumed, and as a result, a codebook may be used.

Exhaustive search is a brute force method in which each combination of transmitter and receiver beams is tried. This results in a significant number of trials. Hierarchical search uses multiple stage scanning of the angular space. Each stage has a corresponding code book. From the first stage to the last stage, the beamwidth of the beams in the codebook decreases. One beam in the codebook of the previous stage may cover the angle range of several beams in the codebook of the following stage. For example, in a first stage, the best transmitter and receiver beams are found through exhaustive search. In a next stage, only beams covered by the beam in the previous stage are searched. Fine beams may be used in the last stage, with any number of stages being used to get to the fine beam stage. Compressive sensing is a sparse channel recovery method based on the compressed sensing theory. MmWave signals typically have one line-of-sight path and a few non-line-of-sight paths. Compressive sensing exploits the sparse nature of the mmWave signal to recover the channel with a small number of observations. A CI-based search is a location assisted search method in which transmitter or receiver location information is used to assist in the beam search.

In exhaustive searches and hierarchical searches there is a tradeoff between searching time and average array gain of the codebook. The higher the average array gain required by the codebook, the larger the codebook size needed, resulting in longer searching time.

In Long Term Evolution (LTE), carrier aggregation is a technology that allows for bandwidth expansion to increase throughput through the aggregation of multiple frequency bands or carriers. The frequency bands may be contiguous or non-contiguous, providing flexible use of available spectrum.

In mmWave bands, the bandwidth of each individual frequency band may be significantly larger than a typical LTE band, and may be from 1 GHz to several GHz. Multiple non-contiguous bands may also be aggregated to further increase channel capacity. Beam squint causes an array gain to vary over frequency, making carrier aggregation at mmWave bands difficult and different from that at the microwave bands.

Beamforming provides space selectivity, with array gain high around the focus angle, but smaller in other angle ranges. In switched beamforming, a codebook comprising multiple beams is used. Beamforming codebooks may assume that the beams in the codebook have the same angle response for all frequencies, and as a result beam squint is ignored. Such codebook designs focus on two directions, and thus minimize the effects of side lobes for less interference and to maximize beamwidth while still maintaining reasonable array gain. This may not provide efficient use of the array, as the array gains for a specific angle may be different for different subcarriers in the wideband system due to beam squint. The added hardware increases system complexity and cost as well as power consumption. The codebook may be advantageously designed with beam squint factored in to meet desired criteria without adding additional hardware. Various examples described herein consider analog beamforming with a ULA system model.

Beam squint is often ignored, as a beamforming vector w is usually designed for the carrier frequency. To achieve the highest array gain for a beam focus angle $\theta_F$, the phase shifts in the beamforming vector w may follow the equation below:

$$\beta_n(\theta_F) = 2\pi c^{-1} f_c (n-1) d \sin \theta_F, \; n=1,2,\ldots,N,$$

where $f_c$ is the carrier frequency.

In a traditional model, the angles of transmission and reception may be frequency dependent, but are modeled as if they were frequency independent. A more accurate equation for the baseband discrete-time channel modes for subcarrier $n_f$ may be advantageously expressed by the equation below:

$$\mathcal{H}(n_f) = \frac{1}{\sqrt{N_R N_T}} \sum_{l=1}^{N_l} g_{p,l} w_R^H a_R(\theta_{R,l}, n_f) a_T^H(\theta_{T,l}, f) w_T e^{-j2\pi n_f \kappa_l / N_f}.$$

where of is the size of the OFDM symbol, and $k_l$ is the discrete-time delay of path 1 in number of samples.

The fractional bandwidth may be defined as:

$$b := B/f_c,$$

As a result, $\xi$ may vary from 0.983 to 1.017 in a system with a 2.5 GHz bandwidth at a 73 GHz carrier frequency. Various examples described herein focus on the magnitude of the array gain.

Figure 3:
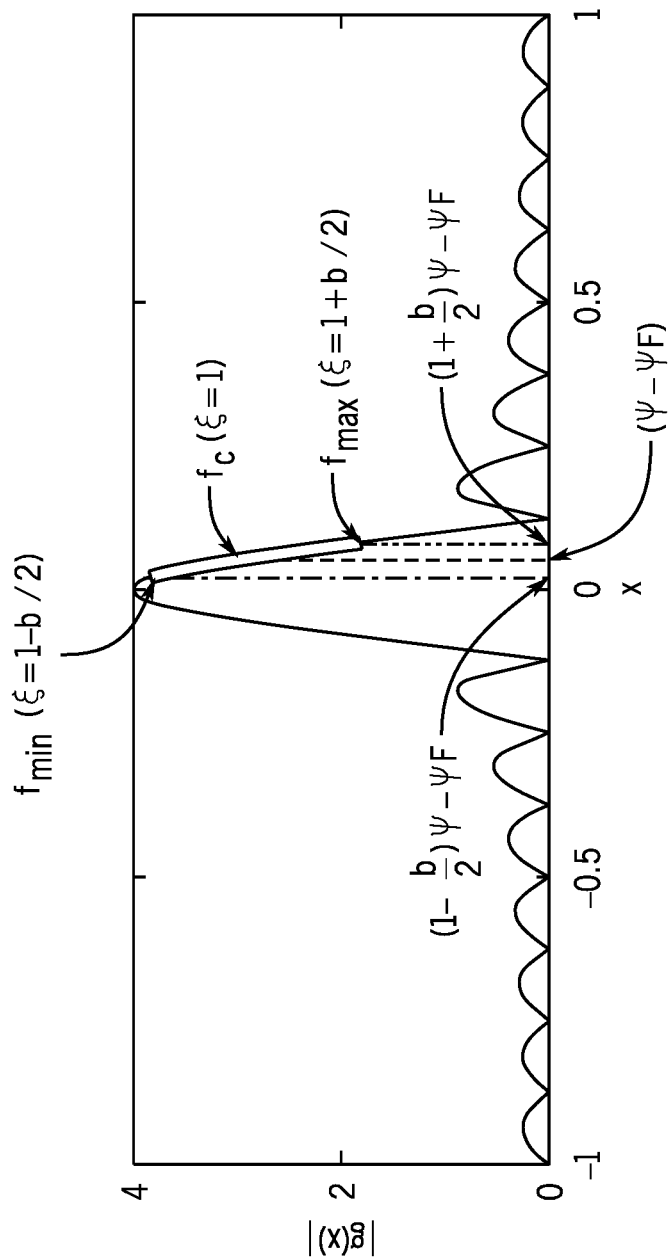
FIG. 3 illustrates an example of g (x) for a fine beam, in accordance with various examples.

FIG. 3 illustrates an example of g (x), in accordance with the following equation:

$$g(x) = \frac{\sin\left(\frac{N\pi x}{2}\right)}{\sqrt{N} \sin\left(\frac{\pi x}{2}\right)} e^{j\frac{(N-1)\pi x}{2}}$$

FIG. 3 uses N=16 antennas in a ULA and an antenna spacing of $$d = \lambda \frac{c}{2}.$$

The bold curve shows the array gain variation for different frequencies within the band.

The corresponding maximum array gain is given by the formula:

$$g_m = \max_{\psi \in [-1,1]} |g(\psi - \psi_F)| = \sqrt{N}.$$

Beam squint increases if the AoA is away from the beam focus angle, while beam squint increases as the beam focus angle increases.

Figure 4A:
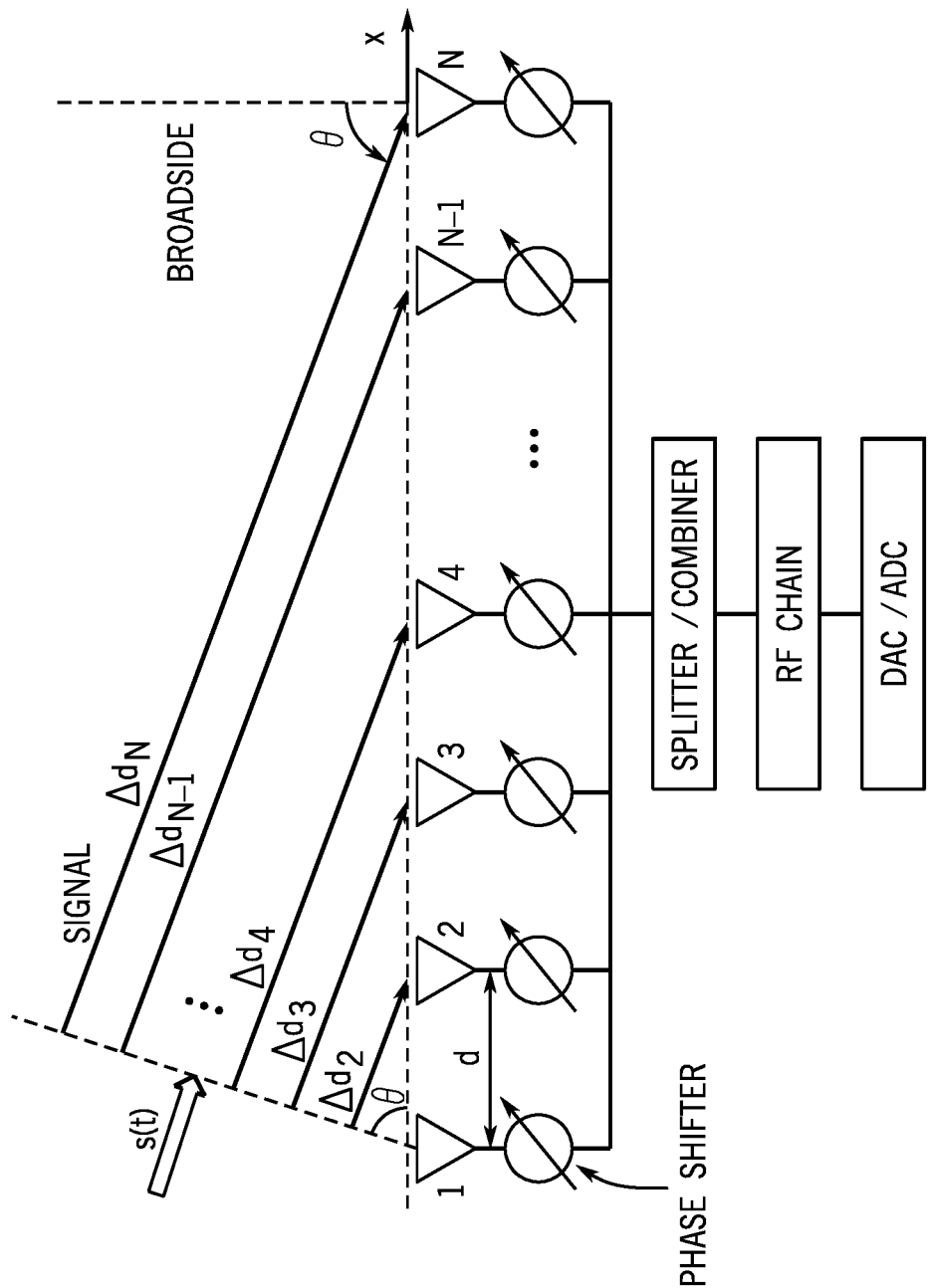
FIG. 4A depicts the structure of a uniform Linear array (ULA) structure in accordance with various examples.

FIG. 4A depicts the structure of a uniform linear array (ULA) structure. The figure shows a linear array of N antennas, the distance between adjacent antennas is d, and θ denotes either the angle-of-arrival (AoA) for reception or the angle-of-departure (AoD) for transmissions. The additional distance to the $n^{th}$ antenna is denoted $\Delta d_n$. Various examples described herein work with beamforming using phase shifters. However, this approach may be used for digital forms of phase shifting and time delay schemes.

Figure 4B:
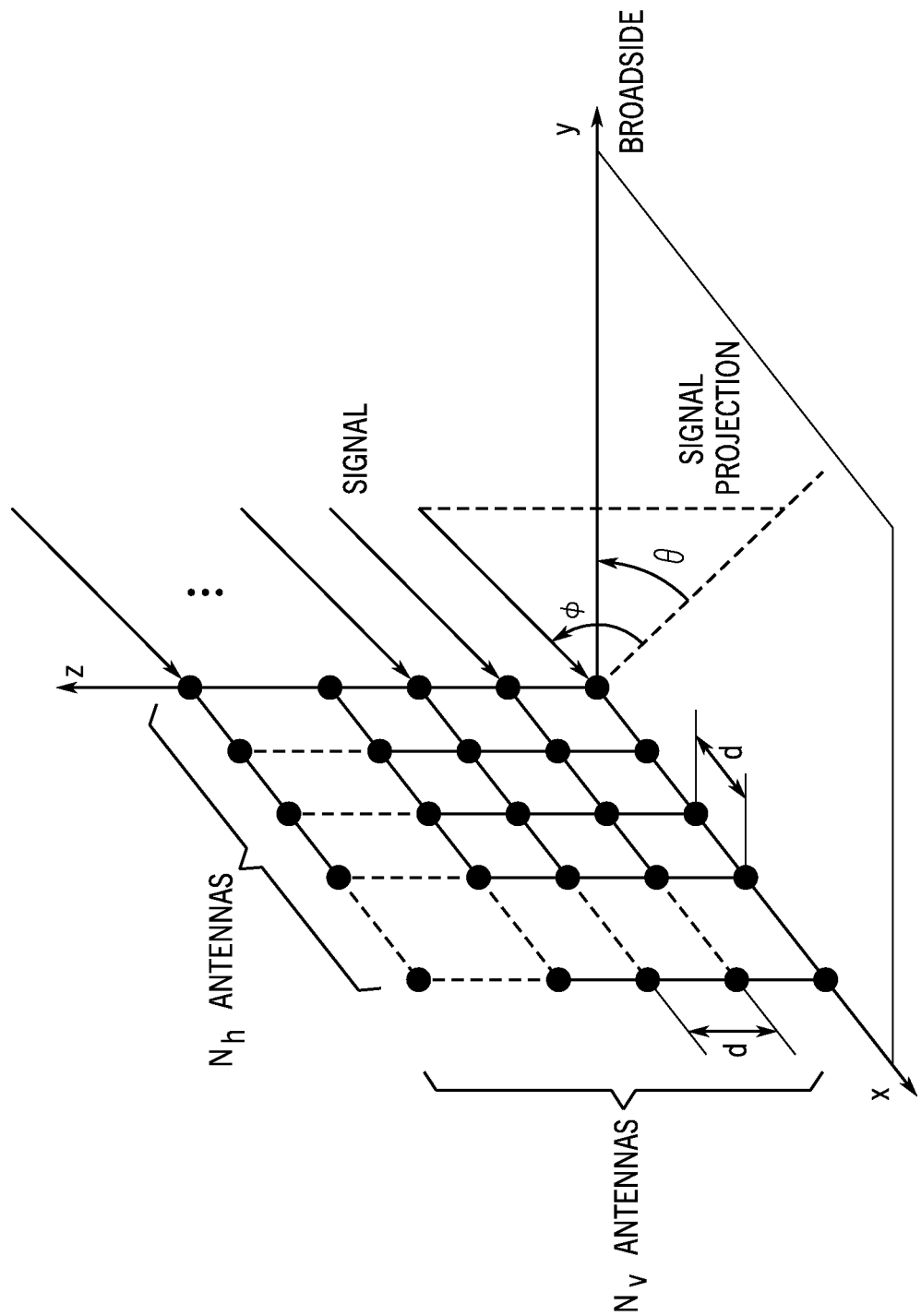
FIG. 4B depicts the structure of a uniform planar array (UPA) structure in accordance with various examples.

FIG. 4B shows the structure of a UPA with analog beam forming using phase shifters. Each dot indicates one antenna, and each antenna is connected to one phase shifter. There are $N_a = N_h N_v$ antennas where $N_h$ is the number of antennas in the horizontal direction, and $N_v$ is the number of antennas in the vertical direction. The distance between adjacent antennas is d. θ denotes azimuth angle and is defined as the angle between the y axis and the signal's projection on the x-y plane; φ denotes elevation angle and is defined as the angle between signal and the x-y plane.

$$\theta, \phi \in \left[-\frac{\pi}{2}, \frac{\pi}{2}\right].$$

Virtual AoA/AoD is denoted as $$\Psi = [\phi, \phi]^T,$$

where the virtual azimuth angle and the virtual elevation angle are $$\Psi = \sin\theta \cos\phi,$$
$$\varphi = \sin\phi,$$

respectively. Since $\theta, \phi$ are bounded by $[-\pi, \pi]$, $$\varphi^2 + \phi^2 = \sin^2\theta \cos^2\phi + \sin^2\phi \leq \cos^2\phi + \sin^2\phi \leq 1.$$

The array gain for beam focus angle $\Psi f$, AoD/AoD $\Psi$ and $\xi$ is given by the equation below:

$$G(\Psi_F, \Psi, \xi) = \frac{\sin\left(\frac{N_h\pi}{2}(\xi\psi - \psi_F)\right)}{\sqrt{N_h}\sin\left(\frac{\pi}{2}(\xi\psi - \psi_F)\right)} e^{j\frac{(N_h-1)\pi}{2}(\xi\psi - \psi_F)} \cdot$$

$$\frac{\sin\left(\frac{N_v\pi}{2}(\xi\varphi - \varphi_F)\right)}{\sqrt{N_v}\sin\left(\frac{\pi}{2}(\xi\varphi - \varphi_F)\right)} e^{j\frac{(N_v-1)\pi}{2}(\xi\varphi - \varphi_F)}$$

$$= g^{(N)_h}(\xi\psi - \psi_F) g^{(N_v)}(\xi\varphi - \varphi_F),$$

where $g^{(N)}$ is the array gain of a ULA with N antennas. The UPA array gain may be denoted as the product of two ULA array gains with $N_h$ and $N_v$ antennas.

Figure 5:
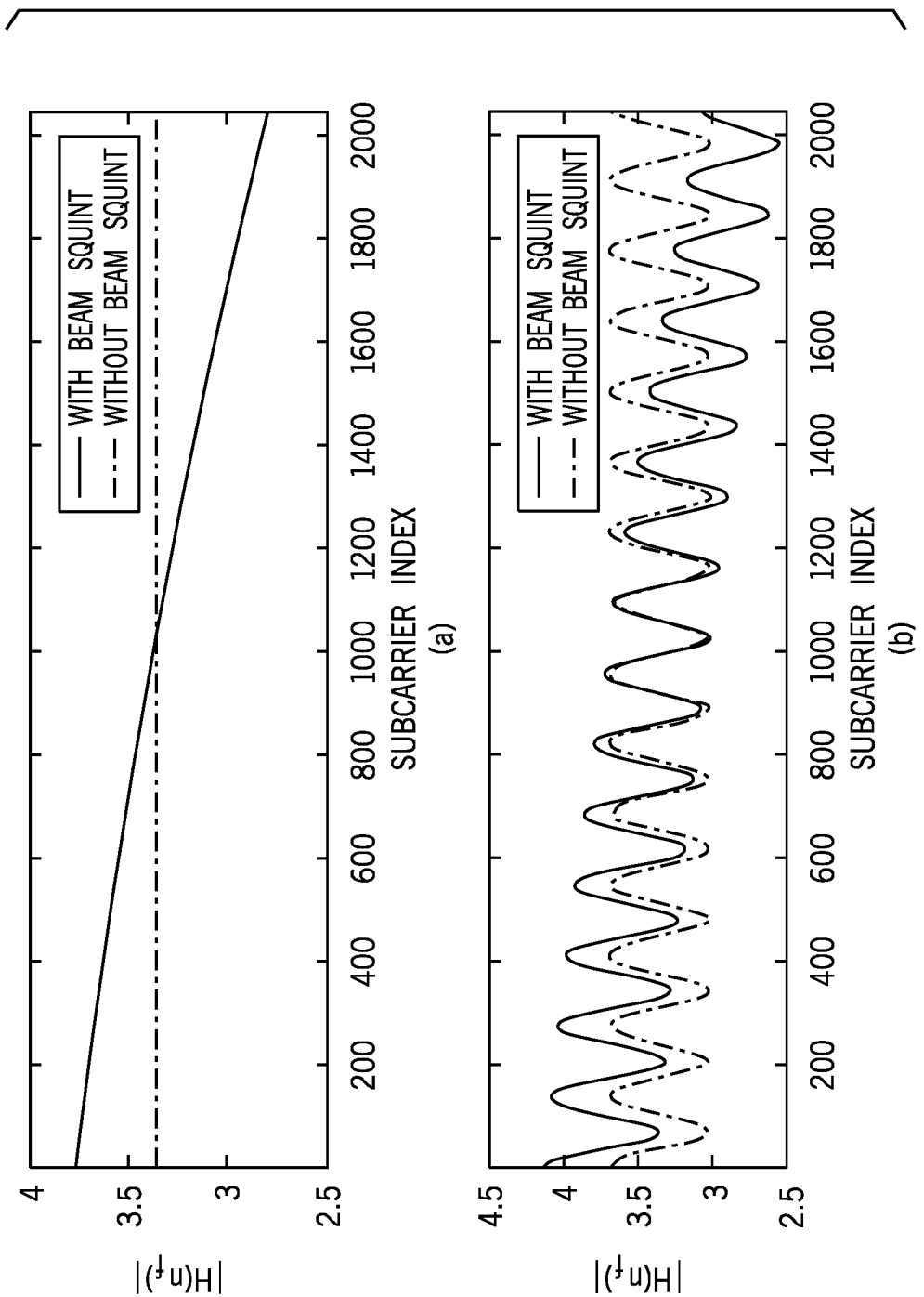
FIG. 5 shows examples of frequency-domain channel gains with and without beam squint, in accordance with various examples.

FIG. 5 provides examples of frequency-domain channel gain with and without beam squint. The channel gain variation of the models has different characteristics when compared with and without beam squint. The array gain variation across frequency for a given AoA/AoD may be converted into the array gain variation across AoA/AoD for the carrier frequency. In the examples in FIG. 5 there is no beam squint at the transmitter, and noise is not considered. N=16, $$d = \frac{\lambda}{2},$$

$\psi R,I=0.94$, b–0.0342 (B=2.5 GHz, $f_c$=73 GHz) and $N_f$=2048. In FIG. 5(a) there is only one path. In FIG. 5(b) there are two paths, path 0 and path 15, with both paths having the same AoA. The channel gain of path 15 is 10% that of path 0.

Figure 6:
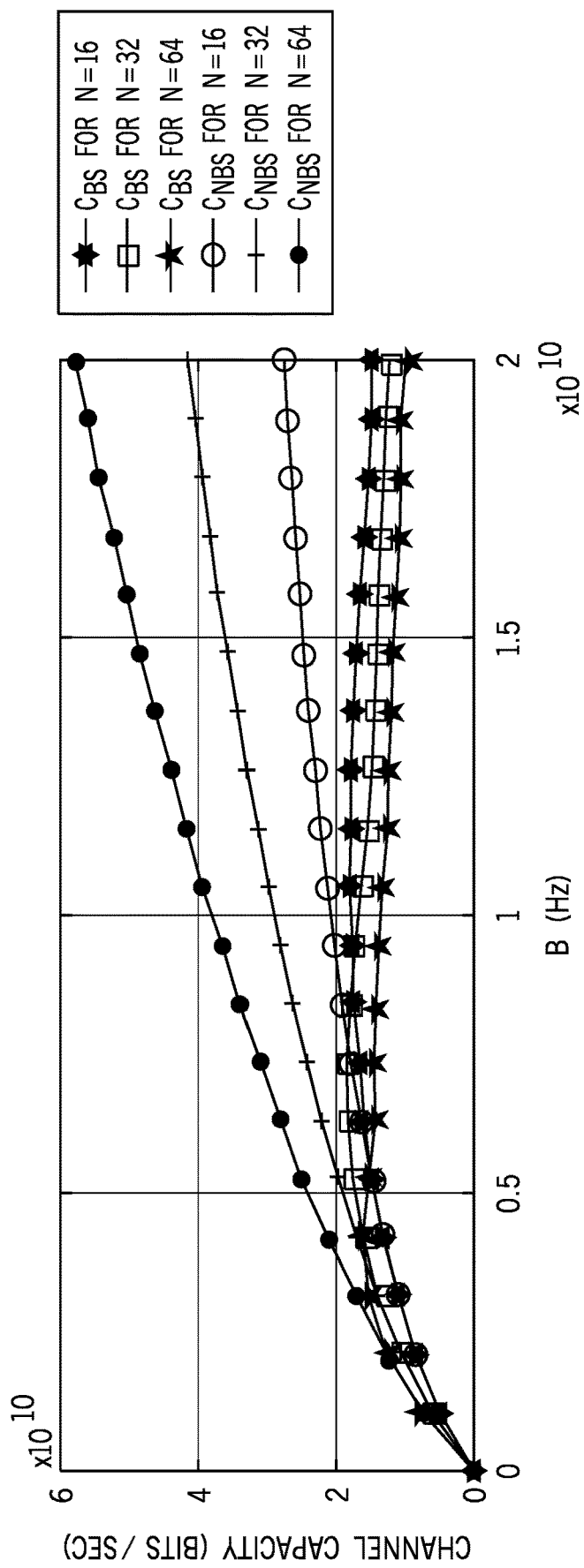
FIG. 6 shows the effect of beam squint on channel capacity, in accordance with various examples.

FIG. 6 shows the effect of beam squint on capacity. Beam squint decreases channel capacity. $C_{BS}$ ($\psi F, \psi, b$) as a function of bandwidth for $\psi=\psi F=0.9$ with fixed PR/$\sigma^2$=2× $10^9$ Hz, d=$\lambda c/2$, and $N_f$=2048.

The reduction in channel capacity caused by the beam squint increases as (a) the number of antennas in the array increases; (b) the fractional bandwidth increases; or (c) the magnitude of the beam focus angle increases.

Figure 7:
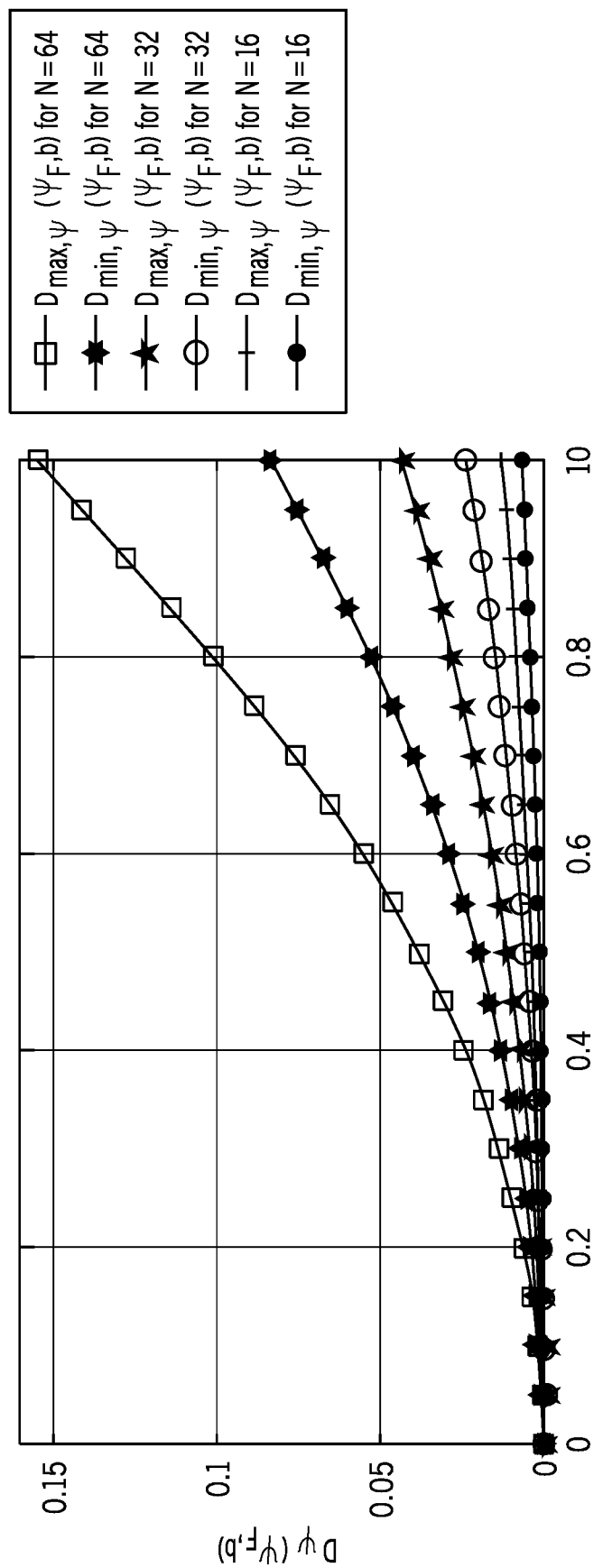
FIG. 7 shows the changes in $D_{max}$, $\psi$ and $D_{min}$, $\psi$ as a function of beam focus angle $\psi F$, in accordance with various examples.

FIG. 7 shows examples of the maximum and minimum relative capacity loss across $\psi \in R_0$ ($\psi F$). $D_{min}\psi(\psi, b)$ and Dmin, $\psi(\psi F, b)$ increase as N and $\psi F$ get larger.

Figure 8:
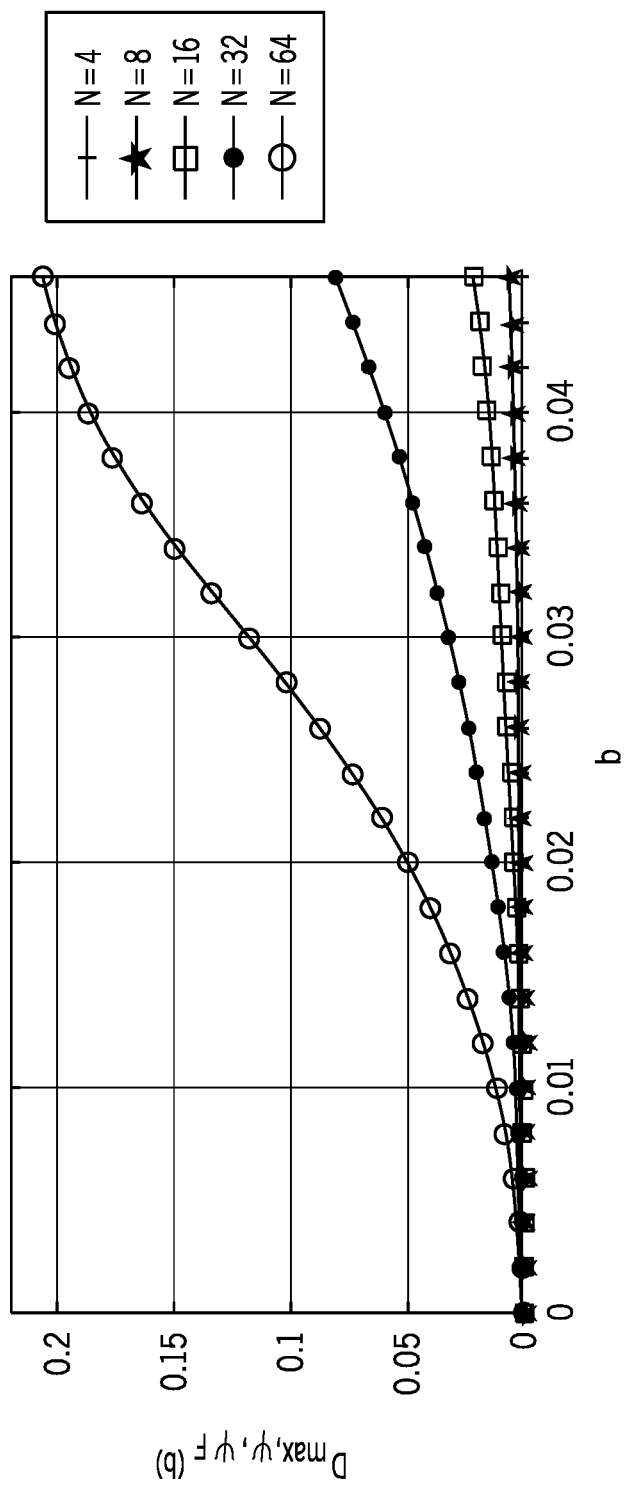
FIG. 8 shows maximum relative capacity loss among all possible fine beams $D_{max}$, $\psi$, $\psi F$ as function of fractional bandwidth, in accordance with various examples.

FIG. 8 shows the maximum relative capacity loss among all possible fine beams as a function of the fractional bandwidth b. d=$\lambda/2$, $N_f$=2048 and $P_R/B\sigma^2$=0 dB.

The relative capacity loss tends to increase as the AoA is away from the beam focus angle $\psi F$. The maximum relative capacity loss is achieved when AoA $\psi$ is on the 3 dB contour.

Figure 9:
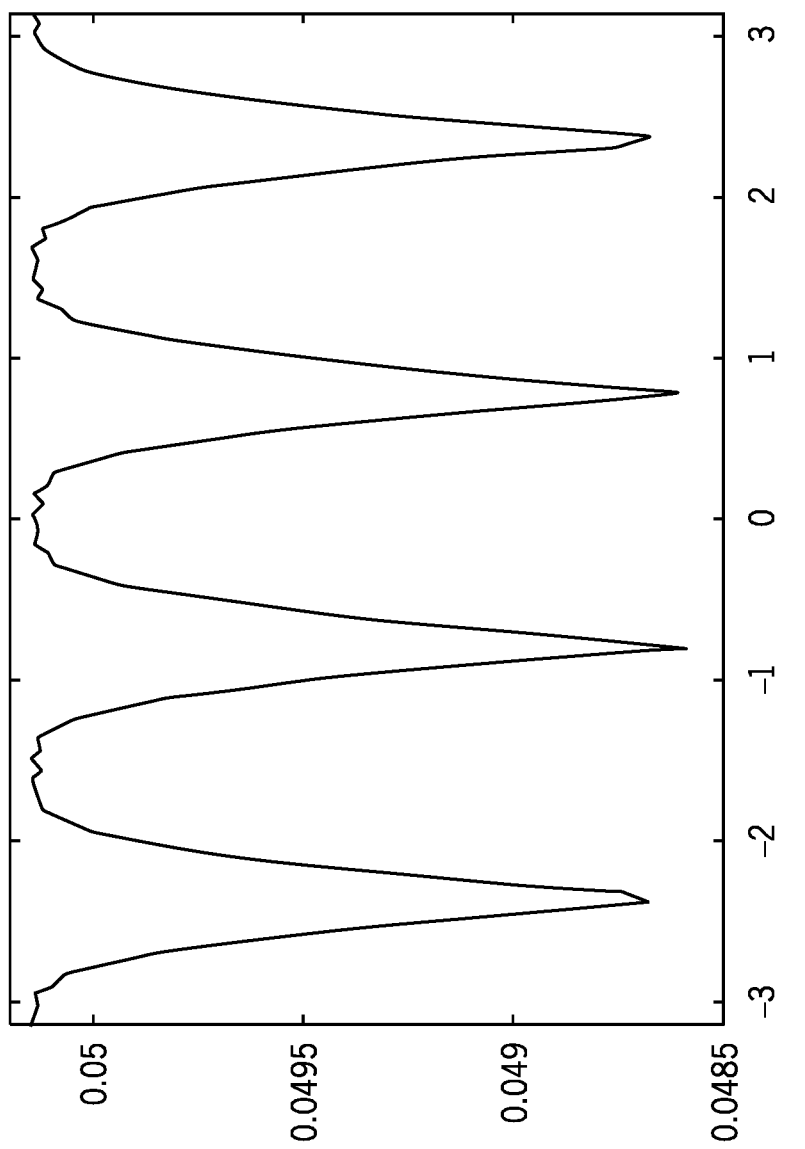
FIG. 9 shows the variation of $D_{max}$, $\psi$ of a 64×64 element UPA as a function of $\alpha F$, in accordance with various examples.

FIG. 9 shows the variation of D as a function of $\alpha_F$ for fixed $|\psi_F|$=0.5, d=$\lambda/2$, B=2.5 GHz, $f_c$=73 GHz, b=0.0342, $N_f$=2048, and $P_R/B_\sigma^2$=0 dB for the formula $$D_{max,\Psi,\alpha_F}^{(P)}(|\Psi_F|, b) = \max_{\alpha_F \in [-\sigma,\sigma]} D_{max,\Psi}^{(P)}(|\Psi_F|, \alpha_F, b)$$

The effect of beam squint on the relative capacity loss of a ULA with N antennas is known, such that a N×N UPA may therefore be estimated. The reduction in channel capacity increases as the increase of: (a) the number of antennas in the horizontal and vertical direction N; (b) the fractional bandwidth, b; and (c) the magnitude of beam focus angle, $|\Psi_F|$.

Design Criteria 1 (Maximum Path Gain): For the case with $N_1$ paths, suppose the channel capacity with beams focusing on path 1 is $C_1$. that is, $\psi T,F=\psi T,I$ and $\psi R,F=\psi R,I$ the selected path 1* is $$l^* = \arg\max_{l \in \{1,2,\ldots,N_l\}} g_{p,l}.$$

Channel capacity may be a useful performance metric for the channel estimation algorithms, as the channel capacity is expected to decrease as channel estimation error increases. Within an OFDM system, a Gaussian Maximum-Likelihood Channel Estimation (MLE) may be developed. The uplink multipath fading channel is modeled such that the channel state can be determined by estimating the unknown channel parameters. The OFDM system may be modeled with bandwidth B and $N_f$ subcarriers. The corresponding MLE of H is $$\hat{\mathcal{H}}_{MLE} = Ah_{MLE} = A(Q_p^H Q_p)^{-1} Q_p^H (s'_p \odot r_p)$$

where A is transform matrix with entries $$|A|_{n,t} = e^{-j/N_f}, 0 \leq n \leq N_f-1, 0 \leq 1 \leq L-1.$$

If $Q_p$ is full rank and $N_p > L$.

The inputs of the MLE are $s_p$, $r_p$, and the indexes of the pilots. The output is the estimated channel vector $H_{MLE}$.

Figure 10:
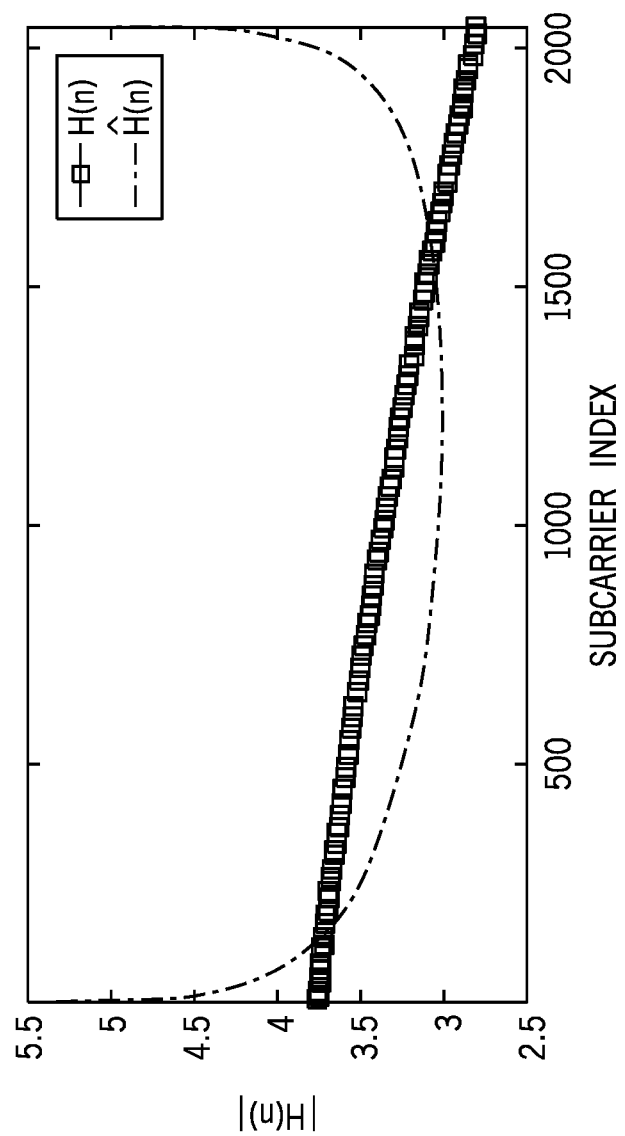
FIG. 10 illustrates an example of channel estimation with MLE and with beam squint in the receiver. There is only one path and there is no beam squint in the transmitter, in accordance with various examples.

FIG. 10 illustrates an example of channel estimation with MLE. There is a significant difference between the estimated channel and the actual channel. Noise is not considered in FIG. 10.

The development of channel estimation using Mean Squares Error (MSE) in the time-frequency domain for algorithms is an effective tool that may be used to compare different approaches.

Γ0 is the MSE of channel estimation error for the channel between the transmitter and receiver RF chains. Γ0 varies as H(n) proportionally changes. Therefore, the comparison with Γ0 is not fair for channel estimation errors of different array gain. To make a fair comparison among different array sizes and AoA, an MSE of path gain between Tx and Rx arrays may be used:

$$\Gamma(\psi_F, \psi, b) = \mathbb{E}\left[\sum_{l=0}^{N_f-1} |\hat{g}_{p,l} - g_{p,l}|^2\right]$$

$$= \mathbb{E}\left[|\hat{g}_{p,0} - g_{p,0}|^2 + \sum_{l=1}^{N_f-1} |\hat{g}_{p,l}|^2\right]$$

$$= \mathbb{E}\left[\frac{1}{N_f}\sum_{n=0}^{N_f-1} \left|\frac{\hat{\mathcal{H}}(n)}{g(\xi_n\psi - \psi_F)} - \frac{\mathcal{H}(n)}{g(\xi_n\psi - \psi_F)}\right|^2\right],$$

where $g\odot_{p,l}$ is the path gain between arrays, $g\odot_{p,l}$ is the estimated path gain between arrays. The equality above may be derived from Parseval's theorem. The MSE is a function of ($\psi F, \psi, b$).

Figure 11:
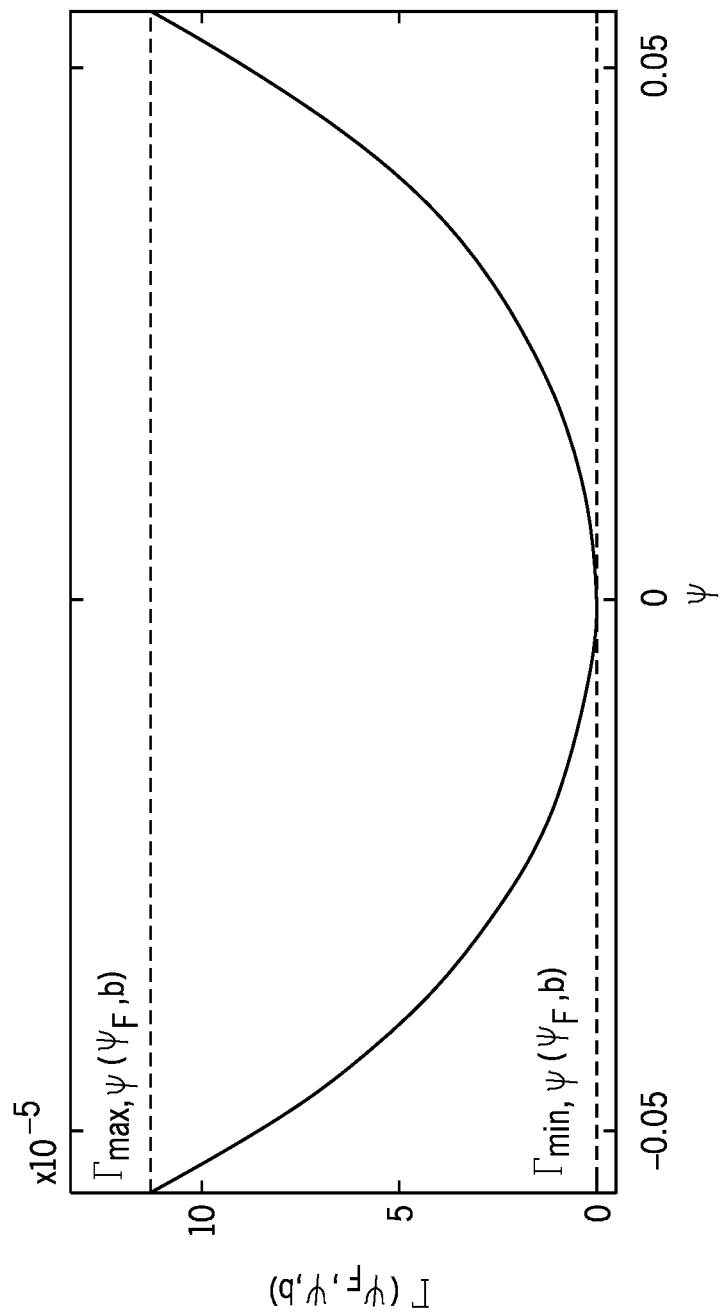
FIG. 11 illustrates an example of Γ ($\psi F$, $\psi$, b) as a function of $\psi$ for fixed beam focus angles $\psi F=0$, in accordance with various examples.

FIG. 11 illustrates an example of Γ ($\psi F, \psi, b$) as a function of $\psi$ for fixed beam focus angles of $\psi F$=0. There is no beam squint when $\psi=0$. Within a 3 dB beamwidth, the MSEs on two sides tend to be higher than that in the center. When $\psi F \neq 0$, the smallest MSE is a beam not located at $\psi F$, but at a $\psi$ with $|\psi|<|\psi F|$.

Figure 12:
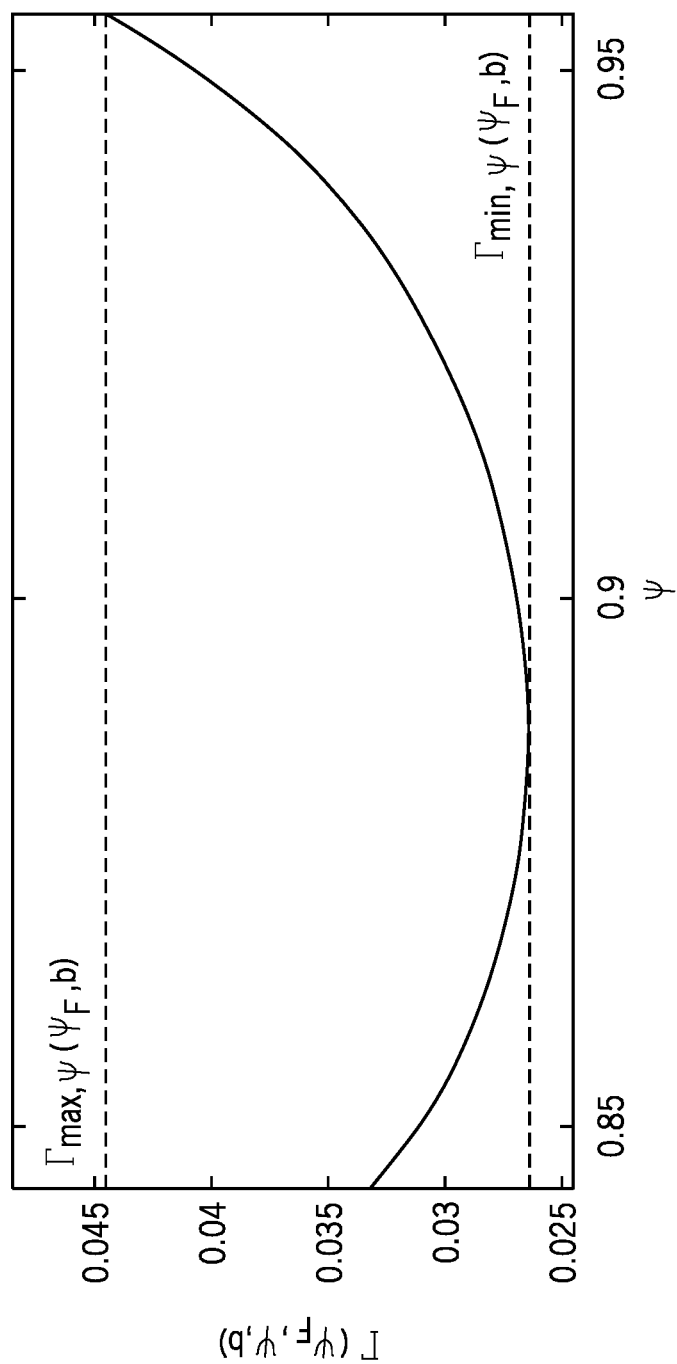
FIG. 12 illustrate examples of Γ($\psi F$, $\psi$, b) in a fine beam as a function $\psi$ of for fixed beam focus angles $\psi F=0.9$, in accordance with various examples.

FIG. 12 illustrates a further example of $\Gamma$ ($\psi F$, $\psi$, b) in a fine beam as a function of $\psi$ for fixed beam focus angles $\psi F=0.9$. The dotted lines indicate maximum and minimum values, respectively.

Beam squint reduces channel capacity, and the reduction of spectral efficiency increases with the fractional bandwidth. The reduction in channel capacity caused by beam squint increase with the increase of (a) the number of antennas in the array; (b) the fractional bandwidth; and/or (c) the magnitude of the beam focus angle.

Some methods use beamforming with a single band. In practice, the transmitter and receiver may have the opportunity to access multiple non-contiguous bands to increase the throughput, through carrier aggregation. Even if the bandwidth of each individual band is small, the aggregated channels and carriers can also introduce significant beam squint issues, for example if they are widely separated. Accordingly, carrier aggregation with beam squint for a pair of transmitter array and receiver array may be advantageously developed using ULA.

Two beam squint scenarios are considered, carrier aggregation with one-sided beam squint and carrier aggregation with two-sided beam squint. Carrier aggregation with one-sided beam squint is summarized and applied to carrier aggregation with two-sided beam squint.

An OFDM system may be used to aggregate multiple non-contiguous bands. In such an aggregation, overlap of any two bands may be avoided, and it may be assumed that the array is designed based on the aggregate center frequency. That is, that the distance between two adjacent antennas $d=\lambda_a/2$. There are $N_{f,i}$, where $i=1, 2, \ldots, N\_B$ subcarriers in band i. The maximum transmission power across all band is P. There is one dominant signal path, and the remainder of the other paths are filtered out by the transmitter and receiver arrays.

Carrier aggregation with one-sided beam squint may pose challenges to maximizing channel capacity. The beam squint may be on either the transmitter or receiver side. For example, the transmitter gain may be $g_T$. To maximize the channel capacity, water filling power allocation may be used across bands. The total channel capacity of all bands with beam squint at AoA $\psi$ and beam focus angle $\psi F$ is as shown below:

$$C_{WF}^{(N_B)}(\psi_F, \psi) = \sum_{i=1}^{N_B} \frac{B_i}{N_{f,i}} \sum_{n=0}^{N_{f,i}-1} \log\left(1 + \frac{N_{f,i} P_{i,n}^* |g_T g_p g(\xi_{i,n}\psi - \psi_F)|^2}{B_i \sigma^2}\right)$$

where $P^*_{i,n}$ is the power allocated to subcarrier n of Baud i such that $$P_{i,n}^* = \left(v - \frac{B_i \sigma_{i,n}^2}{N_{f,i}}\right)^+, n = 0, 1, \ldots, N_{f,i}-1.$$

Here to $i=1, 2, \ldots, N_B$ and $n=0, 1, \ldots, N_{f,i}-1$, $$\sigma_{i,n}^2 = \frac{\sigma^2}{|g_T g_p g(\xi_{i,n}\psi - \psi_F)|^2},$$

and v is chosen such that $$\sum_{i=1}^{N_B} \sum_{n=0}^{N_{f,i}-1} \left(v - \frac{B_i \sigma_{i,n}^2}{N_{f,i}}\right)^+ = P,$$

where $(x)^+:=\max(x,)$. For a given AoA $\psi^*F$, the optimal beam focus angle is desired, in order to maximize channel capacity, that is, $$\psi_F^*(\psi) = \arg\max_{\psi_F} C_{WF}^{(N_B)}(\psi_F, \psi).$$

The transmission power allocations are different for different beam focus angles $\psi F$, increasing the difficulty to find the optimal beam focus angle. The optimal beam focus angle $$\psi_F^*(\psi) \in \mathcal{R}_{F,S} = \left[\frac{f_1}{f_a}\psi, \frac{f_{N_B}}{f_a}\psi\right],$$

where $R_{f,s}$ is the set of all possible optimal beam focus angles. If $\psi F < f_1/f_a \psi$ or $\psi F > f_{Nb}/f_a \psi$, the channel capacity cannot be maximized.

The beam focus angle among $\mathcal{R}F,s$ that has the largest channel capacity is defined as:

$$\psi_{F,NO}^* = \arg\max_{\psi_F \in \mathcal{R}'_{F,S}} C_{WF}^{(N_B)}(\psi_F, \psi).$$

The subscript NO denotes numerical optimization.

Carrier aggregation may also be performed with two non-contiguous band, Band 1 and Band 2. Both Band 1 and Band 2 have bandwidth B and center frequencies of $f_1$ and $f_2$ respectively. The first frequency $f_1$ may be less than the second frequency $f_2$. Water filling power allocation may be employed to maximize the channel capacity. The total channel capacity of Band 1 and Band 2 with beam squint at AoA $\psi$ and beam focus angle $\psi F$ is given by $$C_{WF}^{(2)}(\psi_F, \psi, B_s) = \frac{B}{N_f} \sum_{i=1}^{2} \sum_{n=0}^{N_f-1} \log\left(1 + \frac{N_f P_{i,n} |g_T g_p g(\xi_{i,n}\psi - \psi_F)|^2}{B\sigma^2}\right),$$

where i is the band index. The power allocation with water filling is the same as above.

Figure 13:
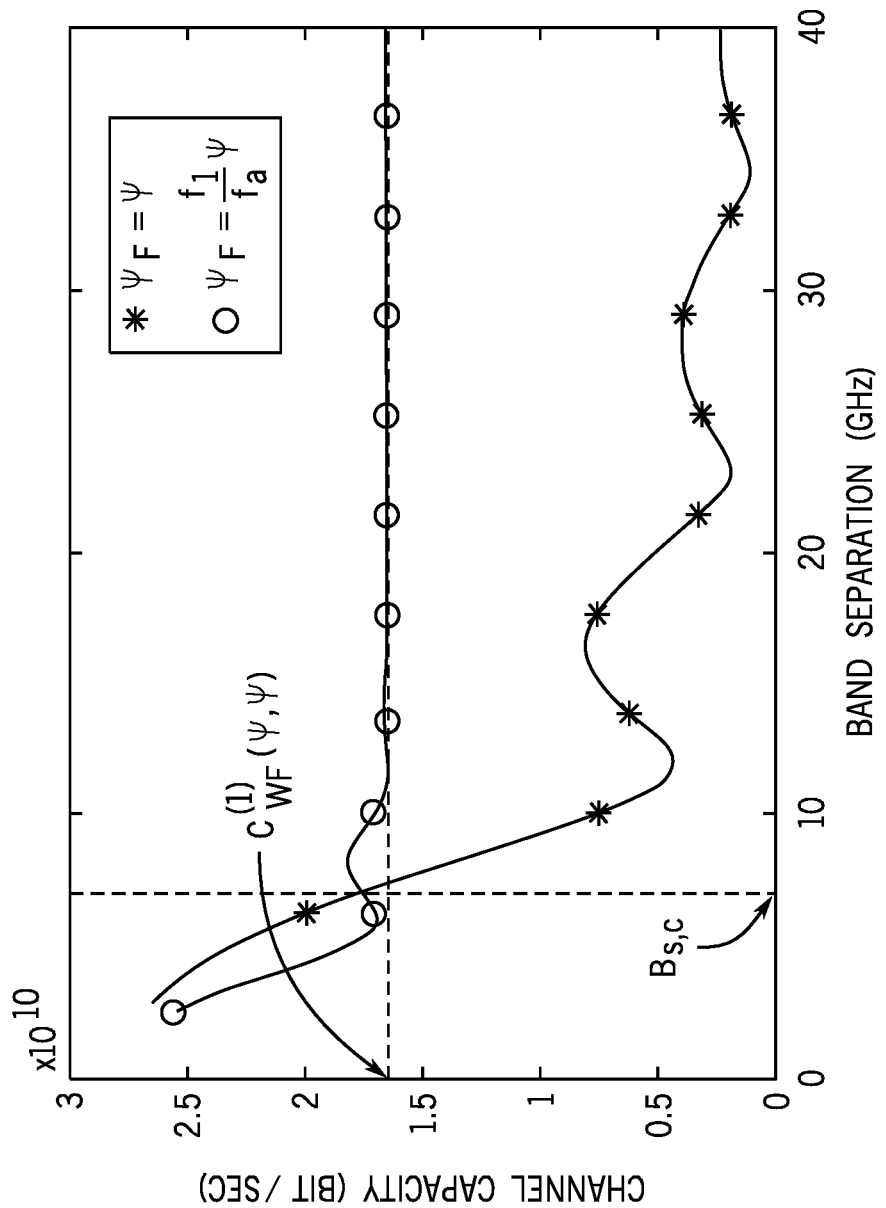
FIG. 13 illustrates critical band separation $B_s$ in accordance with various examples.

As a result, the problem of determining an effective, but generally sub-optimal beam focus angle then becomes the task of identifying the critical band separation $B_{s,c}$. The critical band separation may be obtained by numerically solving the following equation:

$$C_{WF}^{(2)}\left(\psi\frac{f_1}{f_a}, \psi, B_{s,c}\right) = C_{WF}^{(2)}(\psi, \psi, B_{s,c}),$$

where FIG. 13 illustrates critical band separation.

$$f_1 = f_a - \frac{B_{s,c}}{2}.$$

FIG. 13 illustrates examples of functions of band separation $B_s$ in accordance with certain examples of the disclosure. The horizontal dotted line is $C^{(1)}WF(\psi, \psi)$, in which only one channel with bandwidth B is used and the beam focuses on the center of that band.

The challenge becomes how to determine the channel capacity, taking into consideration that the beam focus angle may be in the center of the two bands. Accordingly, the channel capacity may be approximated as:

$$C^{(2)}_{WF}(\psi, \psi, B_s) \approx 2B\log\left(1 + \frac{P|g_T g_P g(\psi f_1/f_a - \psi_c)|^2}{2B\sigma^2}\right) =$$

$$2B\log\left(1 + \frac{P\left|g_T g_P g\left(\psi \frac{B_s}{2f_a}\right)\right|^2}{2B\sigma^2}\right).$$

Combining previously derived formulae provides:

$$2B\log\left(1 + \frac{P\left|g_T g_P g\left(\psi \frac{B_{s,c}}{2f_z}\right)\right|^2}{2B\sigma^2}\right) =$$

$$B\log\left(1 + \frac{P_1|g_T g_P \sqrt{N}|^2}{B\sigma^2}\right) + B\log\left(1 + \frac{P_2\left|g_T g_P g\left(\psi \frac{B_{s,c}}{f_a}\right)\right|^2}{B\sigma^2}\right)$$

Beam squint may be ignored within a band for both the Aggregation Regime and Disaggregation Regime, that is, different subcarriers within each band have the same array gain, and the channel capacity of each band can be approximated to the channel capacity without beam squint in that band.

Beam squint may still be considered for different bands. Water filling is used to allocate power to the bands to maximize the total channel capacity.

If the beam focus angle is on the center of the two bands, (e.g., $\psi F=\psi$) equal power is allocated to both bands due to symmetry. Therefore, the channel capacity may be approximated as $$C^{(2)}_{WF}(\psi, \psi, B_s) \approx 2B\log\left(1 + \frac{P|g_T g_P g(\psi f_1/f_a - \psi_c)|^2}{2B\sigma^2}\right) =$$

$$2B\log\left(1 + \frac{P\left|g_T g_P g\left(\psi \frac{B_s}{2f_a}\right)\right|^2}{2B\sigma^2}\right).$$

Combining (5.18), (5.20), and (5.21).

$$2B\log\left(1 + \frac{P\left|g_T g_P g\left(\psi \frac{B_{s,c}}{2f_a}\right)\right|^2}{2B\sigma^2}\right) =$$

$$B\log\left(1 + \frac{P_1|g_T g_P \sqrt{N}|^2}{B\sigma^2}\right) + B\log\left(1 + \frac{P_2\left|g_T g_P g\left(\psi \frac{B_{s,c}}{f_a}\right)\right|^2}{B\sigma^2}\right)$$

The critical band separation $B_{s,c}$ is inversely proportional to the absolute value of AoA $\psi$.

The critical band separation $B_{s,c}$ monotonically increases as $SNR_r$ increases.

In approximating the critical AoA with the band separation $B_s$, aggregated center frequency $f_a$, and $SNR_r$ are fixed, the optimal beam focus angle depends on the AoA $\psi$.

$$\psi^*_{F,sub} = \begin{cases} \psi, & |\psi| \leq \psi_c, \\ \frac{f_i}{f_a}\psi, & |\psi| > \psi_c, \end{cases}$$

where i=1, 2. The corresponding channel capacity follows $$\begin{cases} C^{(2)}_{WF}(\psi_c, \psi_c, B_s) > C^{(2)}_{WF}(\psi_c f_1/f_a, \psi_c, B_s), & |\psi| < \psi_c, \\ C^{(2)}_{WF}(\psi_c, \psi_c, B_s) = C^{(2)}_{WF}(\psi_c f_1/f_a, \psi_c, B_s), & |\psi| = \psi_c, \\ C^{(2)}_{WF}(\psi_c, \psi_c, B_s) < C^{(2)}_{WF}(\psi_c f_1/f_a, \psi_c, B_s), & |\psi| > \psi_c. \end{cases}$$

The critical AoA $\psi_c$ may be larger than 1. In this case, $|\psi|$ is always smaller than $\psi_c$, and the beam focus angle focuses on the center of the two bands (e.g., $\psi F=\psi$) to maximize the total channel capacity.

The critical AoA $\psi$ monotonically increases as $SNR_r$ increases.

To decide whether or not to aggregate frequency band, the approximation 1 criterion is if the beam focus angle is on the center of one of the bands, for example, Band 1, the power allocated to Band 2 is very small, and Band 2 can be ignored in practice. The approximation in the Disaggregation Regime is used and the band with smaller array gain may be ignored. In this case, Band 2 is ignored and the total channel capacity is approximated as $$C^{(2)}_{WF}\left(\psi\frac{f_1}{f_a}, \psi, B_s\right) \approx B\log\left(1 + \frac{P|g_T g_P \sqrt{N}|^2}{B\sigma^2}\right).$$

To solve for $B_{s,c}$, combine (5.18), (5.23) and (5.26) to obtain $$\left(1 + \frac{SNR_r\left|g\left(\psi\frac{B'_{s,c}}{2f_a}\right)\right|^2}{2}\right)^2 = 1 + SNR_r N.$$

Therefore, $$\frac{B_{s,c}|\psi|}{f_a} = 2g^{-1}\left(\sqrt{\frac{2\sqrt{SNR_r N + 1} - 2}{SNR_r}}\right),$$

Design Criteria 2: With approximation 2, to determine when to aggregate two bands and when to use only one of them given band separation $B_s$, AoA $\psi$ and $SNR_r$, carrier aggregation can be applied if:

$$\frac{B_s|\psi|}{f_a} \leq 2g^{-1}\left(\sqrt{\frac{2\sqrt{SNR_r N + 1} - 2}{SNR_r}}\right).$$

The corresponding sub-optimal beam focus angle is $\psi$. Otherwise, it is sensible to use only one band with the beam focus angle to be on the center of the used band, i.e., $$\frac{f_1}{f_a}\psi \text{ or } \frac{f_2}{f_a}\psi.$$

The critical band separation Bs,c is a function of $SNR_r$ for $SNR_r>0$, and $$\lim_{SNR_r \to 0} f(SNR_r) = \sqrt{N},$$

$$\lim_{SNR_r \to \infty} f(SNR_r) = 0.$$

Since $g^{-1}(y)$ is also a monotonically decreasing function of $y$ for $$y \in [0, \sqrt{N}], \frac{B_{s,c}\psi}{f_a}$$

monotonically increases as $SNR_r$ increase.

$$\lim_{SNR_r \to 0} \frac{B_{s,c}|\psi|}{f_a} = g^{-1}(\sqrt{N}) = 0,$$

Figure 14:
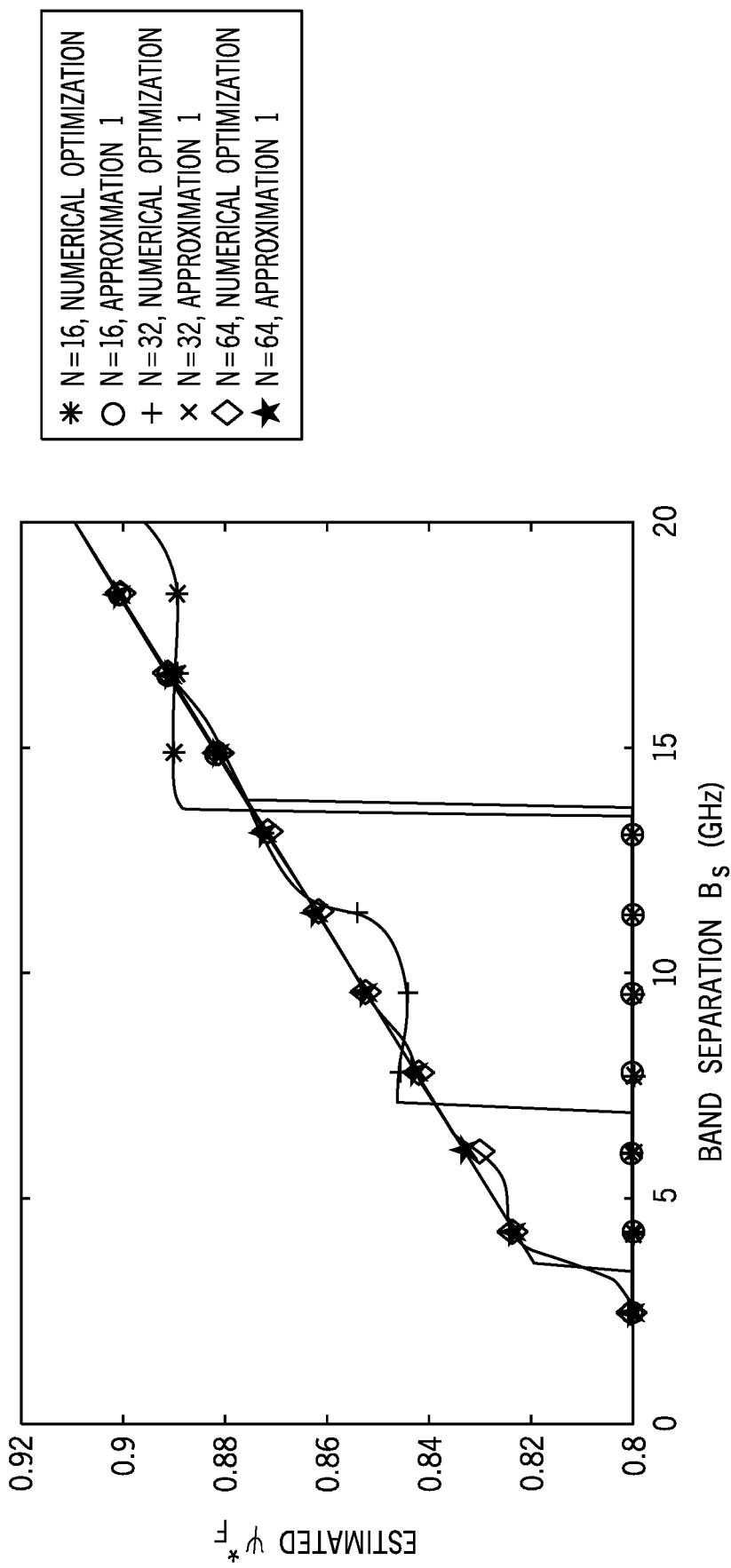
FIG. 14 illustrates the sub-optimal beam focus angles obtained from optimization and approximation 1 as functions of band separation $B_s$ in accordance with various examples.

FIG. 14 illustrates the band separation $B_s$ (GHz) suboptimal beam focus angles obtained from numerical optimization and approximation 1 as functions of band separation $B_s$. This illustrates the estimated optimal beam focus angles with numerical optimization and approximation 1. The plot indicates small differences between the two methods. These results suggest that the beam focus angle derived with approximation 1 may be reasonable in practice.

Figure 15:
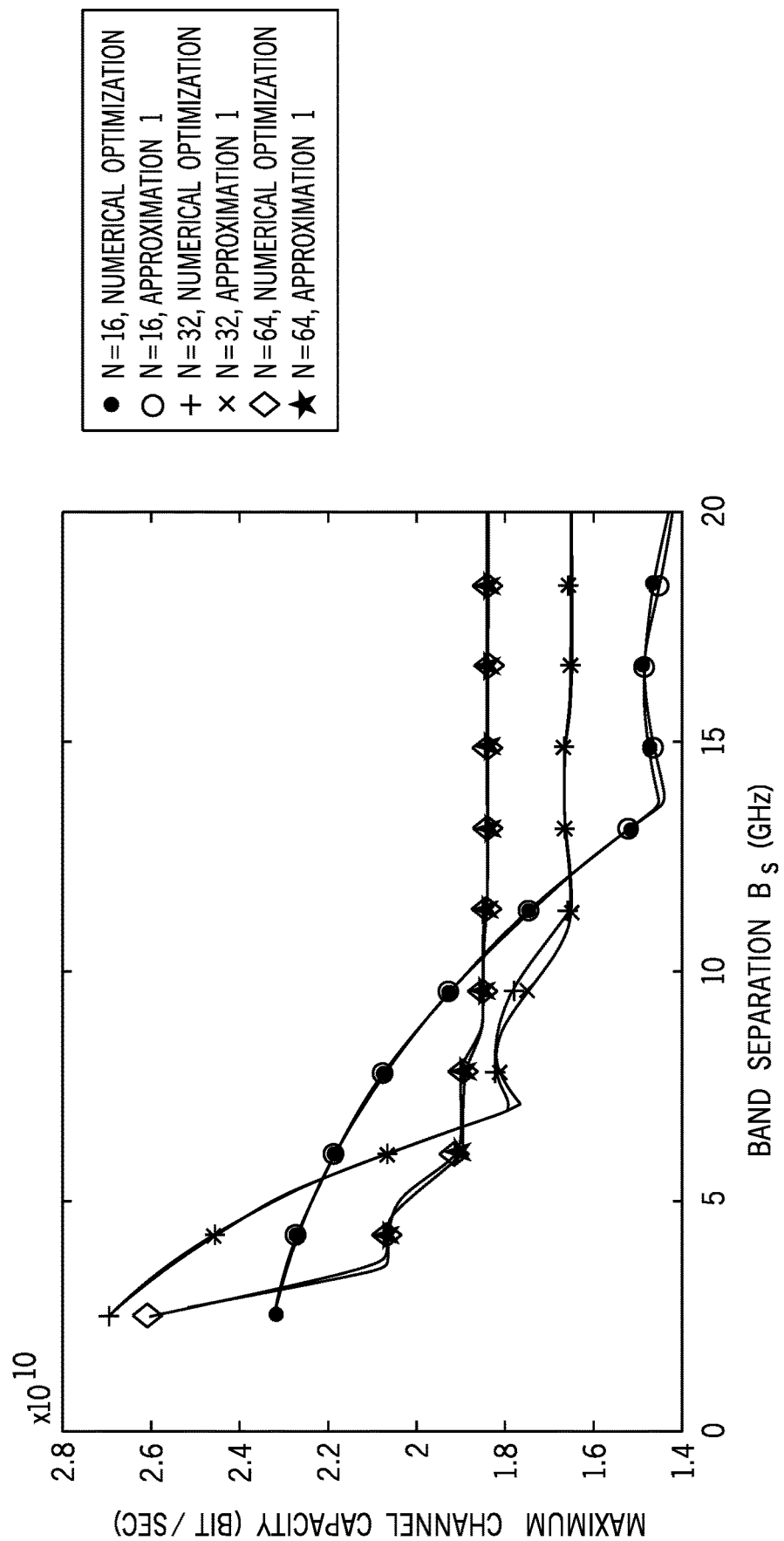
FIG. 15 illustrates the maximum channel capacity obtained from the numerical optimization and approximation 1 as functions of band separation $B_s$ in accordance with various examples.

FIG. 15 illustrates the maximum channel capacities obtained from numerical optimization and approximation 1. The channel capacities from the two methods have small difference, showing the effectiveness of the approximation 1.

The carrier aggregation with two-sided beam squint may also be developed with the aim of finding the optimal beam focus angle vector to maximize the channel capacity. The optimal beam focus angles may therefore follow $$\psi^*_{T,F}(\psi) \in \mathcal{R}_{T,F,S} = \left[\frac{f_1}{f_a}\psi_T, \frac{f_{N_B}}{f_a}\psi_T\right],$$

$$\psi^*_{R,F}(\psi) \in \mathcal{R}_{R,F,S} = \left[\frac{f_1}{f_a}\psi_R, \frac{f_{N_B}}{f_a}\psi_R\right],$$

where $R_{T,F,S}$ is the set of all possible transmitter optimal beam focus angles, and $R_{R,F,S}$ is the set of all possible receiver optimal beam focus angles.

The beam focus angle vector that achieves the largest channel capacity is $$[\psi^*_{T,F,NO}, \psi^*_{R,F,NO}]^T = \underset{\psi_{T,F} \in \mathcal{R}'_{T,F,S}, \psi_{R,F} \in \mathcal{R}'_{R,F,S}}{\mathrm{argmax}} C^{(N_B)}_{WF}(\psi_{T,F}, \psi_T, \psi_{R,F}, \psi_R).$$

where $\psi_{T,F,NO}$ is the transmitter beam focus angle and $\psi_{R,F,NO}$ is the receiver beam focus angle. The subscript NO denotes numerical optimization.

Similar to the carrier aggregation with one-sided beam squint, if there is more information on the band allocation, the information may be used to reduce the complexity of the numerical optimization.

For the carrier aggregation of two symmetric bands where there are none contiguous bands, the carrier setup may the same as before. For example, each has bandwidth B, and there are $N_f$ subcarriers in each band. $f_1<f_2$, the center frequency $f_a$ is still in the center of the two bands and the ratio of subcarrier frequencies to aggregate center frequency for subcarrier n in Band i, i=1, 2 is the same. There is no overlap between the two bands, therefore the two bands can be treated as a single band.

The total channel capacity of Band 1 and Band 2 with beam squint at AoA $\psi$ and beam focus angle $\psi F$ is $$C^{(2)}_{WF}(\psi_{T,F}, \psi_T, \psi_{R,F}, \psi_R, B_s) =$$

$$\frac{B}{N_f} \sum_{i=1}^{2} \sum_{n=0}^{N_f-1} \log\left(1 + \frac{N_f P_{i,n} |g_T(\xi_{i,n}\psi_T - \psi_{T,F})g_P g_R(\xi_{i,n}\psi_R - \psi_{R,F})|^2}{B\sigma^2}\right).$$

where i is band index. The power allocation with water filling is the same.

$$C^{(2)}_{WF}(\psi_{T,F}, \psi_T, \psi_{R,F}, \psi_R, B_s)$$

The capacity is a function of the band separation. The optimal beam focus angle vector becomes $$[\psi^*_{T,F}, \psi^*_{R,F}]^T = \underset{\psi_{T,F} \in \mathcal{R}_{T,F,S}, \psi_{R,F} \in \mathcal{R}_{R,F,S}}{\mathrm{argmax}} C^{(2)}_{WF}(\psi_{T,F}, \psi_T, \psi_{R,F}, \psi_R, B_s).$$

Similar to the carrier aggregation with one-sided beam squint, it is preferable not to aggregate beyond certain values of the system parameters, such as band separation, AoA, and signal-to-noise ration (SNR).

For increasing band separation, similar to the carrier aggregation with one-sided beam squint, small band separation is started with. If the band separation Bs is small, the two bands perform similarly to a single band. The maximum channel capacity is achieved if both the transmitter beam focus angle and receiver beam focus angle are on the center of the two bands, that is, $\psi^*_{T,F}=\psi_T$ and $\psi^*_{R,F}=\psi_R$. The corresponding maximum channel capacity achieved is $$C^{(2)}_{WF}(\psi_T, \psi_T, \psi_R, B_s).$$

Using approximation 1, the beam squint within each band may be ignored, and different subcarriers within each band have the same array gain. If the band separation $B_s$ is small, the array gains of the two bands may be the same for both the transmitter and receiver arrays. Both transmitter and receiver arrays are in aggregation regime. Carrier aggregation with two-sided beam squint may be separated into two problems of carrier aggregation with one-sided beam squint: specifically, one-sided carrier aggregation with the receiver array assuming no beam squint in the transmitter, and one-sided carrier aggregation with the transmitter array assuming no beam squint in the receiver. The critical band separations for the transmitter and receiver are BT,s,c and BR,s,c, respectively. The equivalence of the separation breaks when either the transmitter or the receiver enters disaggregation regime.

As $B_s$ increases, the two bands move away from the center of the array's main lobe, the array gain decreases for both arrays while both bands' array gains stay the same, and the channel capacity decreases. Eventually, as $B_s$ continues increasing, it is better for either the transmitter array or the receiver array to enter the Disaggregation Regime. Again, similar to the carrier aggregation with one-sided beam squint, Band 1 for Disaggregation Regime without loss of generality may be focused on. Band 1 may have smaller signal attenuation than Band 2 due to its lower frequency. The receiver may therefore focus on Band 1. The array gains of the receiver for both bands may not be the same any more. The condition for the transmitter array to be in aggregation regime may not exist. At this point, the total channel gain for Band 2 is therefore typically much smaller than that of Band 1, and may be ignored with Approximation 2.

From the principle of waterfilling the transmitter array is forced to enter disaggregation regime and to focus on Band 1, which is the band that the receiver focuses on. In summary, both arrays enter disaggregation regime when one of the arrays does. The system critical band separation $B_{s,c}$ follows $$B_{s,c} = \min\{B_{T,s,c}, B_{R,s,c}\}.$$

where $B_{T,s,c}$ is the critical band separation of one-sided carrier aggregation with the transmitter array assuming no beam squint in the receiver, and $B_{R,s,c}$ is the critical band separation of one-sided carrier aggregation with the receiver array assuming no beam squint in the transmitter.

Figure 16:
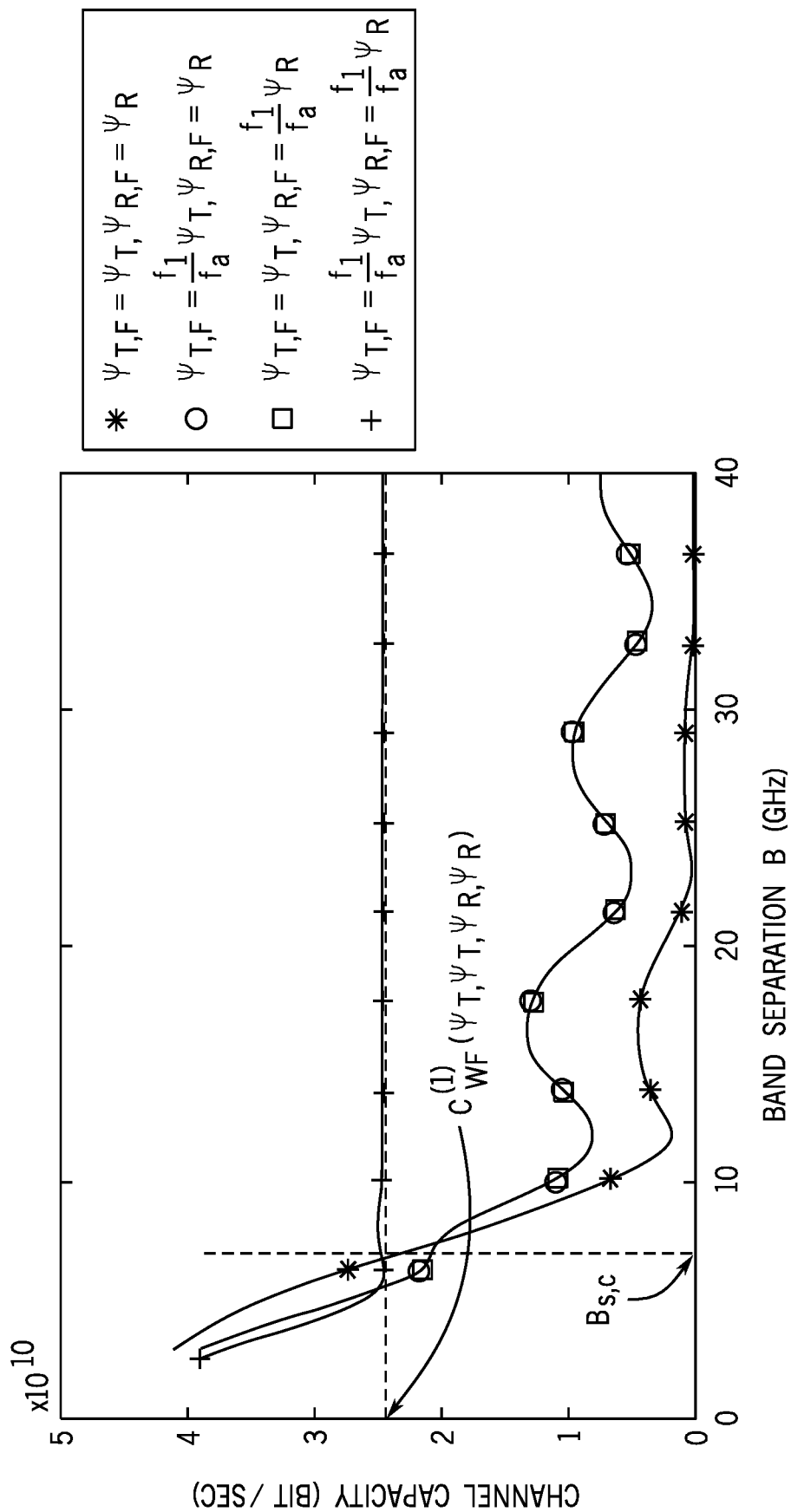
FIG. 16 illustrates as the bands separation between the two bands the channel capacity drops off, in accordance with various examples.
Figure 17:
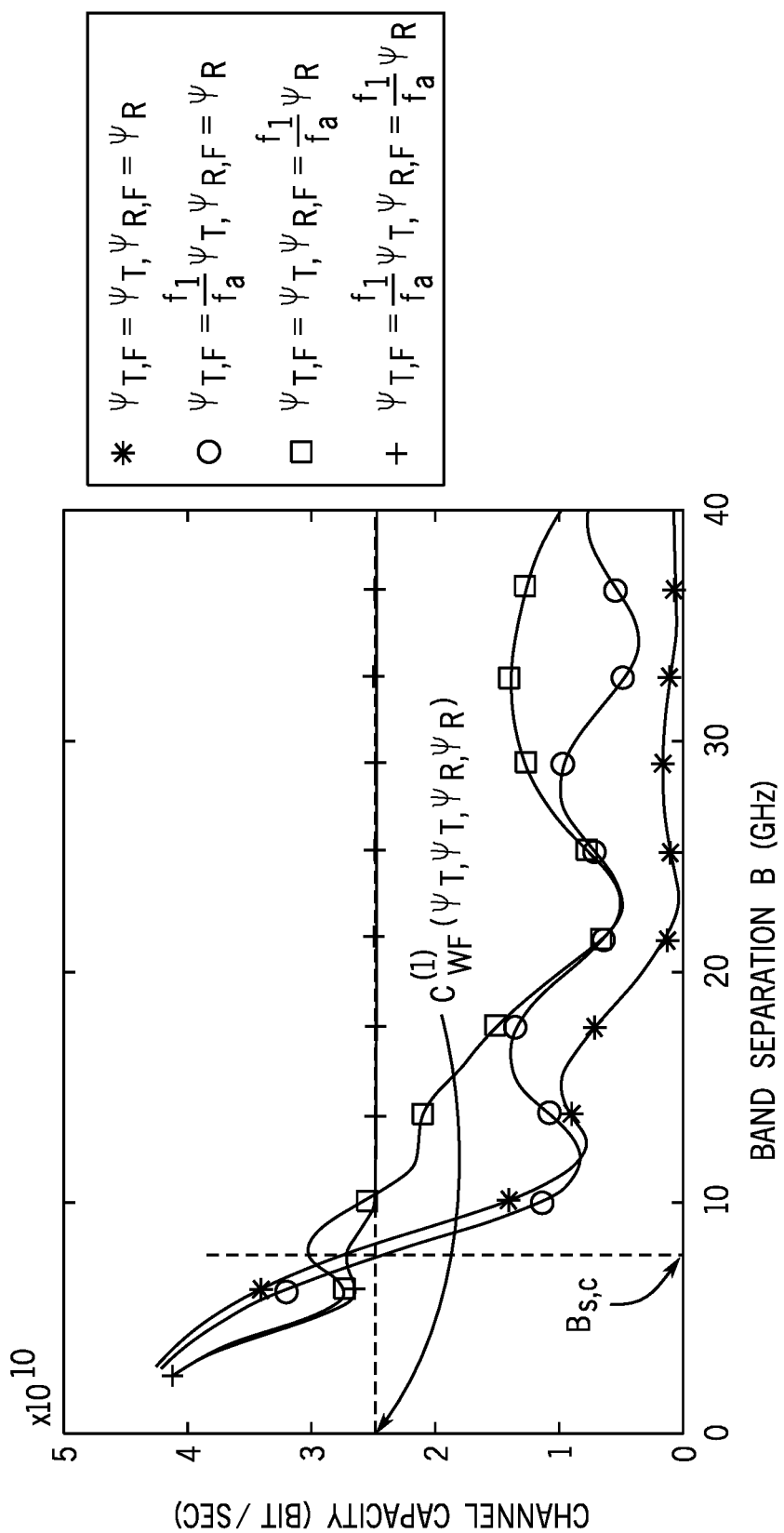
FIG. 17 illustrates as the separation between the bands as functions of the band separation $B_s$ channel capacity drops off in accordance with various examples of the disclosure.

FIG. 16 & FIG. 17 show examples of the following channel capacities as functions of the band separation $B_s$:

$$C_{WF}^{(2)}(\psi_T, \psi_T, \psi_R, B_s),$$

$$C_{WF}^{(2)}(\psi_{T,f1/fa}, \psi_T, \psi_R, \psi_R, B_s),$$

$$C_{WF}^{(2)}(\psi_T, \psi_T, \psi_{R,f1/fa}, \psi_R, B_s),$$

$$C_{WF}^{(2)}(\psi_{T,f1/fa}, \psi_T, \psi_{R,f1/fa}, \psi_R, B_s),$$

FIG. 16 illustrates that as the band separation Bs increases channel capacity drops off. The horizontal dotted line is $$C_{WF}^{(1)}(\psi_T, \psi_T, \psi_R, \psi_R)$$

And the vertical dotted line is $B_{s,c}$=7 GHz.

FIG. 17 illustrates that as the band separation Bs increases channel capacity drops off. The horizontal dotted line is $$C_{WF}^{(1)}(\psi_T, \psi_T, \psi_R, \psi_R)$$

And the vertical dotted line is $B_{s,c}$=7.8 GHz.

To develop the criteria for whether or not to aggregate if the beam focus angle is on the center of one of the bands, for example, Band 1, the power allocated to the other band is very small and may be ignored. Therefore, Approximation 2 may also be used; that is, in the Disaggregation Regime, the band with smaller array gain may be ignored in addition to Approximation 1.

To obtain the critical band separation for the whole system, the critical band separations of both arrays are calculated separately assuming there is no beam squint in the other one. According to Design Criterion 2 for one-sided beam squint, Design Criterion 3 for the two-sided beam squint may be used to determine to aggregate or not to aggregate.

For example, given:

$$SNR_1 = \frac{P\left|g_P g_R\left(\frac{f_1}{f_a}\psi_R - \psi_R\right)\right|^2}{B\sigma^2},$$

$$SNR_2 = \frac{P\left|g_P g_T\left(\frac{f_1}{f_a}\psi_T - \psi_T\right)\right|^2}{B\sigma^2}.$$

Design Criteria 3 is obtained with approximation 2, given separation $B_s$, AoA ψ, and SNR1 and SNR2, two inequalities may exist:

$$\frac{B_s|\psi_T|}{f_a} \leq 2g^{-1}\left(\sqrt{\frac{2\sqrt{SNR_1 N_T + 1} - 2}{SNR_1}}\right),$$

$$\frac{B_s|\psi_R|}{f_a} \leq 2g^{-1}\left(\sqrt{\frac{2\sqrt{SNR_2 N_R + 1} - 2}{SNR_2}}\right),$$

where NT and NR are number of antennas in the transmitter array and receiver array, respectively. If both inequalities are valid, carrier aggregation may be used, and the corresponding sub-optimal transmitter and receiver beam focus angles are ψT and ψR, respectively. If either inequality is not satisfied, only one band may be used with the beam focus angle to be on the center of the used band.

Beamforming codebook design with channel capacity constraint is closely related to the transmitter array, receiver array, and path gain. The codebook may be decoupled from the transmitter and receiver for convenient deployment. One widely used codebook design criteria is to require the array gain to be larger than a threshold $g_t$ for all subcarriers. Codebook design with an array gain constraint as described herein advantageously has no issue of coupling among transmitter array, receive array, and path gain. This beamforming codebook is therefore developed to compensate for the beam squint while satisfying minimum channel array constraint. In the design, the codebook is optimized to maximize the usage of each beam, by minimizing the overlap of adjacent two beams.

For example, a desired beamforming codebook is $$C^*_d = C_d(M_{min}).$$

The optimized minimum codebook array gain may be $$g^*_d = g_d(M_{min}).$$

The desired codebook C*d in paragraph 127 has minimum codebook size and achieves optimized minimum codebook array gain. There may be, for example, two steps to design the codebook. First, determine the minimum codebook size to cover RT while meeting the minimum array gain criteria $G_{c,min} \geq g_t$. Second, align beams in the codebook to maximize the minimum codebook array gain $g_{c,min}$ to achieve the optimized minimum codebook array gain $g_d$.

It may be difficult to find the minimum codebook size before beam alignment. Here, it is assumed that the codebook size M is known, and is used to align the beams in the codebook to achieve the optimized minimum codebook array gain $g_d$.

For given codebook size M, the optimized minimum codebook array gain $g_d$ may be achieved if and only if:

$$\psi_1 = \psi_m,$$

$$\psi_{M,r} = \psi_m,$$

$$\psi_{1,r} = \psi_i \ i=1,2,\ldots,M-1.$$

When $g_d$ is achieved, all the beams in the codebook may have $$g_{\psi_i} = g_w \min(\psi_r) = g_d, \ i=1,2,\ldots,M.$$

The right edge may be derived from the left edge for beam i, i>(M+1)/2.

$$\psi_{i,r} = \frac{\psi_{i,l}(1-b/2) + 2\psi_d}{1+b/2}$$

$$= \frac{2-b}{2+b}\psi_{i,l} + \frac{4}{2+b}\psi_d.$$

The beam focus angle of beam i+1, i≥(M+1)/2 may be expressed as $$\psi_{i+1,F} = \psi_d + \psi_{i+1,l}(1-b/2)$$

$$= \psi_d + \psi_{i,r}(1-b/2)$$

$$= \psi_d + (1-b/2) = \frac{\psi_{i,F} + \psi_d}{1+b/2}$$

$$= \frac{2-b}{2+b}\psi_{i,F} + \frac{4}{2+b}\psi_d.$$

Given the number of beams M, the fractional bandwidth b>0, and the target codebook coverage $R_T=[-\psi m, \psi m]$, the generalized beam edge $$\psi_d(M) = \begin{cases} \dfrac{b\psi_m}{2 - \dfrac{4}{2+b}\left(\dfrac{2-b}{2+b}\right)^{\frac{M-1}{2}}}, & M \text{ is odd,} \\ \dfrac{b\psi_m}{2 - 2\left(\dfrac{2-b}{2+b}\right)^{\frac{M}{2}}}, & M \text{ is even.} \end{cases}$$

The selection of M ensures that $g(\psi_d)>0$. The $\psi_d$ for the case without beam squint may be obtained by $$\lim_{b\to 0}\psi_d(M) = \lim_{b\to 0}\begin{cases} \dfrac{b\psi_m}{2 - \dfrac{4}{2+b}\left(\dfrac{2-b}{2+b}\right)^{\frac{M-1}{2}}}, & M \text{ is odd,} \\ \dfrac{b\psi_m}{2 - 2\left(\dfrac{2-b}{2+b}\right)^{\frac{M}{2}}}, & M \text{ is even.} \end{cases}$$

$$= \frac{\psi_m}{M}.$$

Without beam squint, all beams in the codebook may have the same beamwidth.

For a given codebook size M, there may be one and only one codebook that achieves the optimized minimum codebook array gain $g_d$.

To determine a minimum codebook that yields the minimum array gain constraint gt, the minimum codebook size is $$M_{min} = \begin{cases} M_e, & \text{if } M_e \text{ is even,} \\ M_o, & \text{if } M_e \text{ is odd,} \end{cases}$$

where $$M_o = \left\lceil \frac{2\ln\frac{2+b}{4}\left(2 - \frac{b\psi_m}{g^{-1}(g_t)}\right)}{\ln\frac{2-b}{2+b}} \right\rceil + 1,$$

$$M_e = \left\lceil \frac{2\ln\left(1 - \frac{b\psi_m}{2g^{-1}(g_t)}\right)}{\ln\frac{2-b}{2+b}} \right\rceil.$$

[·] denotes the ceiling function.

Given the minimum array gain threshold $g_t$, the code book design procedure is summarized in FIG. 19. Accordingly, the codebook designed using FIG. 19 is unique, and all the beams are fully utilized.

There may be constraints among the generalized beam edge $\psi_d$, optimized minimum codebook array gain gd, fractional bandwidth b, and the number of antennas N. No codebook exists if any parameter is beyond its constraints. From paragraph 133, the beamwidth of beam i may be obtained:

$$\Delta_i = \psi_{i,r} - \psi_{i,l}$$

$$= -\frac{2b}{2+b}\psi_{i,l} + \frac{4\psi_d}{2+b}$$

$$= -\frac{2b}{2-b}\psi_{i,r} + \frac{4\psi_d}{2-b}.$$

As the beam focus angle moves away from the broad side, the beamwidth decreased. No codebook may meet the minimum array gain requirement. To guarantee the existence of the codebook:

$$\Delta_M = -\frac{2b}{2-b}\psi_{M,r} + \frac{4\psi_d}{2-b} = -\frac{2b}{2-b}\psi_m + \frac{4\psi_d}{2-b} > 0,$$

Given the number of antennas in the array N and fractional bandwidth b, the generalized beam edge $\psi_d$ is the lower bounded by $$\psi_d > \frac{b\psi_m}{2}.$$

Given the number of antennas in the array N and given fractional bandwidth b, the optimized minimum codebook size gd is upper bounded by $$g_d = |g(\psi_d)| < \left|g\left(\frac{b\psi_m}{2}\right)\right| = \frac{\sin\left(\frac{N\pi b\psi_m}{4}\right)}{\sqrt{N}\sin\left(\frac{\pi b\psi_m}{4}\right)}.$$

Codebook size M→∞, the generalized beam edge $\psi_d$→0 and the optimized minimum array gain $g_d$→$g_m$. Therefore $$\psi_d > \lim_{M \to \infty} \begin{cases} \dfrac{b\psi_m}{2 - \dfrac{4}{2+b}\left(\dfrac{2-b}{2+b}\right)^{\frac{M-1}{2}}}, & M \text{ is odd,} \\ \dfrac{b\psi_m}{2 - 2\left(\dfrac{2-b}{2+b}\right)^{\frac{M}{2}}}, & M \text{ is even.} \end{cases}$$

$$= \frac{b\psi_m}{2}.$$

The case of codebook design without beam squint is akin to that of b=0. As the codebook size M→∞, the generalized beam edge ψd→0 and the optimized minimum array gain gd→gm if there is no beam squint. It is easy to mistakenly apply this conclusion to a case with beam squint.

Given the number of antennas in the array N and optimized minimum codebook array gain gd, the fractional bandwidth b is upper bounded by $$b < \frac{2\psi_d}{\psi_m} = \frac{2g^{-1}(g_d)}{\psi_m}.$$

It requires M→∞ for b to converge to the bound,
As b increases, the array gains of different subcarriers tend to have larger difference, reducing the beamwidth. As b grows beyond $$\frac{2\psi_d}{\psi_m}.$$

there are always subcarriers with array gain below gd. Therefore, no codebook exists.

Given the fractional bandwidth b and fixed rg, a number of antennas in the array N has an upper bound, denoted as $N_{sup}$, yielding:

$$N < N_{sup},$$
$$N_{sup} \approx \frac{4\operatorname{sinc}^{-1}(r_g)}{b\pi\psi_m}.$$

As N increases, the beams become thinner, and the array gains of different subcarriers tend to have larger difference. As N grows beyond the upper bound, there are always subcarriers with array gain below gd. Therefore, no codebook exits.

Figure 20:
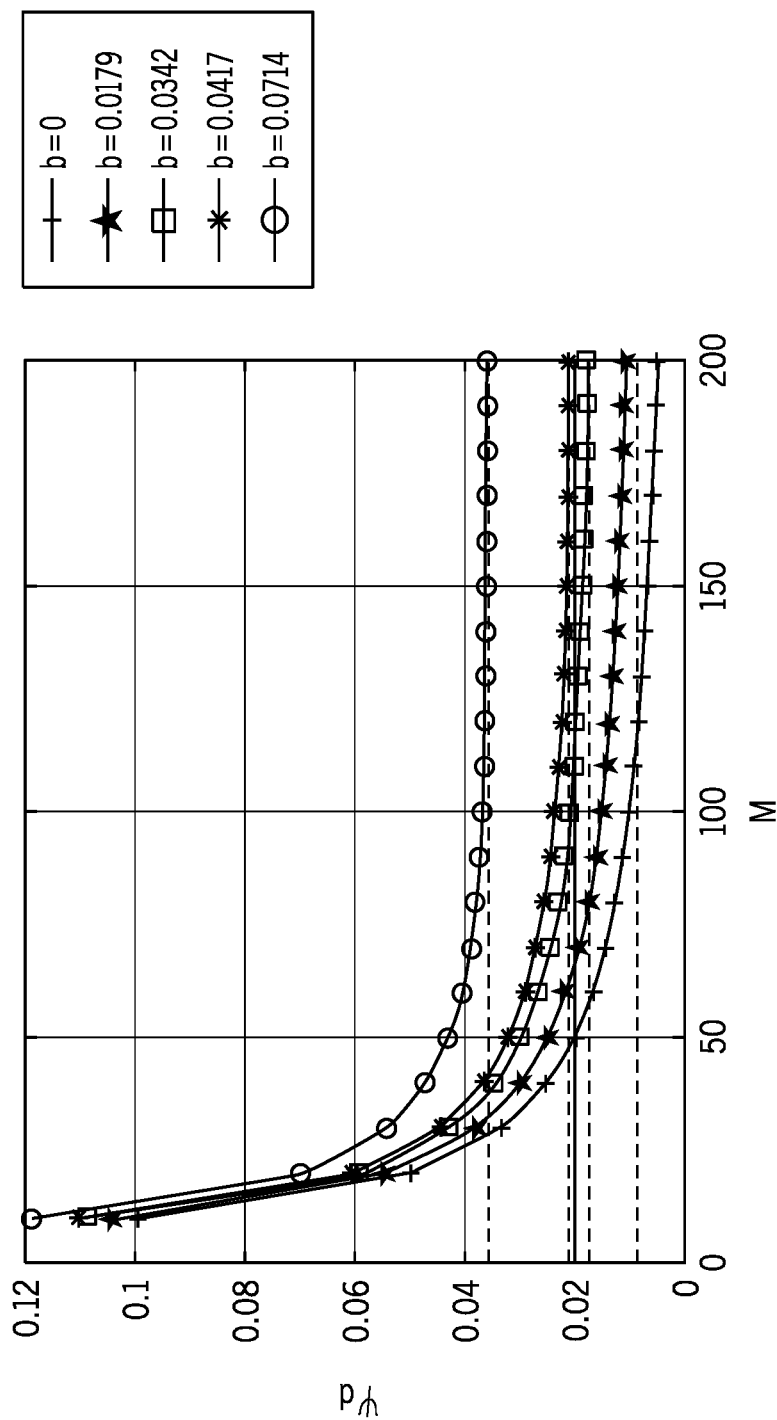
FIG. 20 illustrates the generalized beam edge $\psi d$ as a function of the codebook size M. $\psi d$ is not related to N. $\psi d$ is the lower bounded, in accordance with various examples.

FIG. 20 illustrates the generalized beam edge ψd as a function of the codebook size M. ψd is not related to N. ψd is the lower bounded. As M increases, ψd decreases but larger than its lower bound b ψm/2. The dashed lines show the lower bound for corresponding b, and b=0 corresponds to the case without beam squint.

Figure 21:
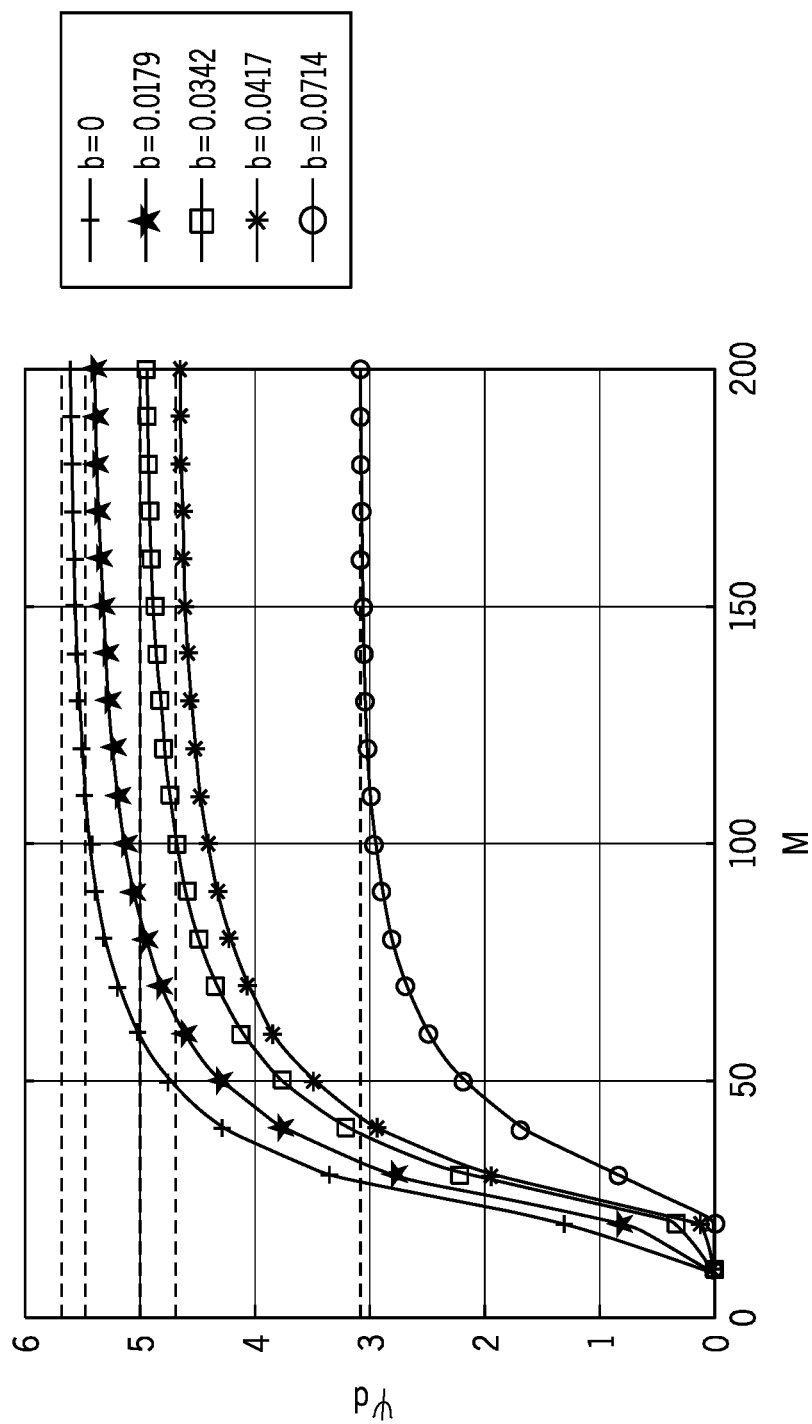
FIG. 21 illustrates the comparison of different fractional bandwidth, in accordance with various examples.

FIG. 21 illustrates the comparison of different fractional bandwidth. As b increases, ψd increases for the same M. reduction $g_d$. The dashed lines show the lower bound for corresponding b.

Figure 22:
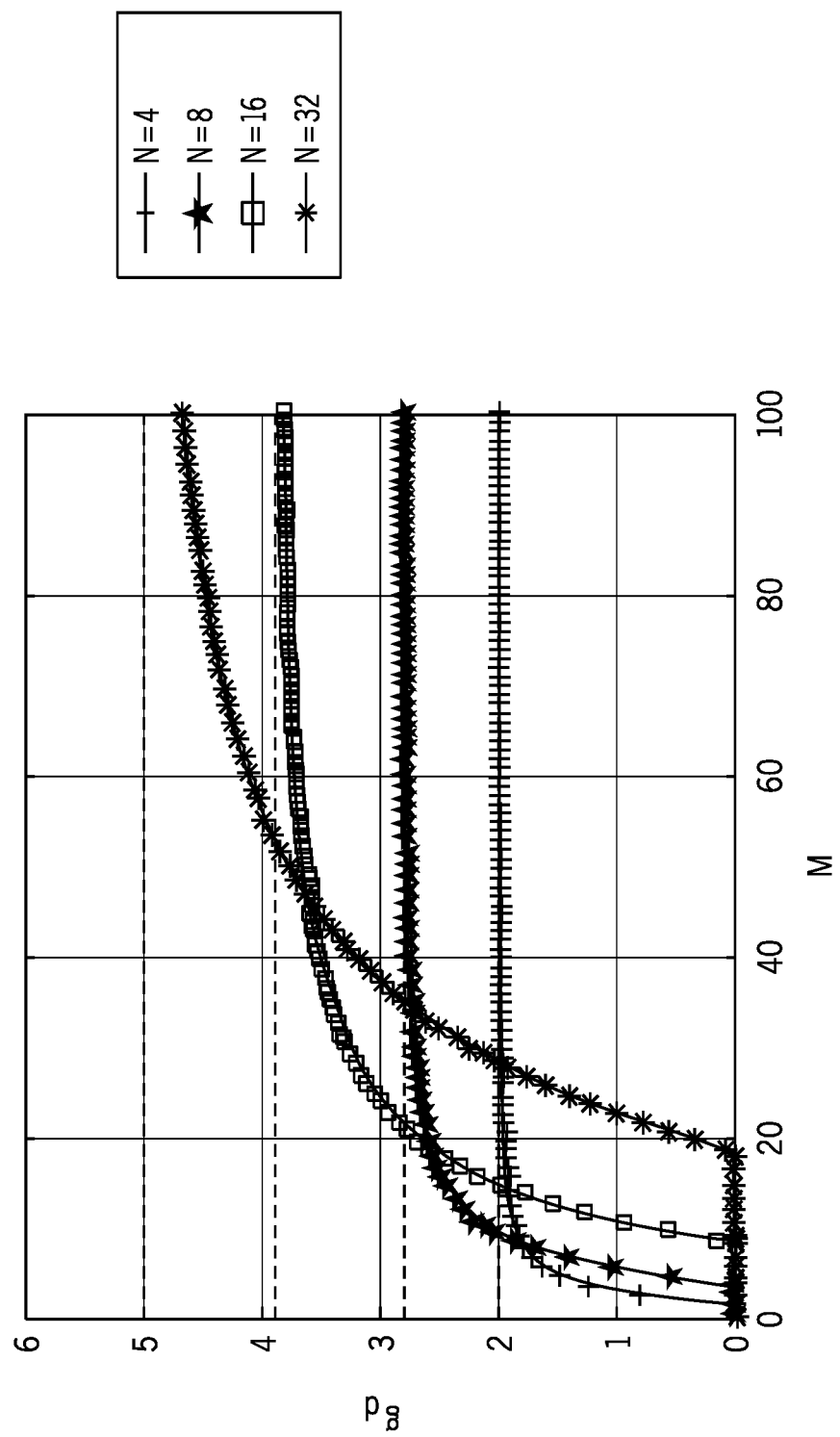
FIG. 22 illustrates the comparison of arrays with different number of antennas N, in accordance with various examples.

FIG. 22 illustrates the comparison of arrays with different number of antennas N. As M increases, gd, grows larger but with slower growth rate until achieving the upper bound. As N increases, the beamwidth becomes smaller, and therefore, more beams are required for gd to move away from zero. The dashed lines show the upper bound for corresponding N.

Figure 23:
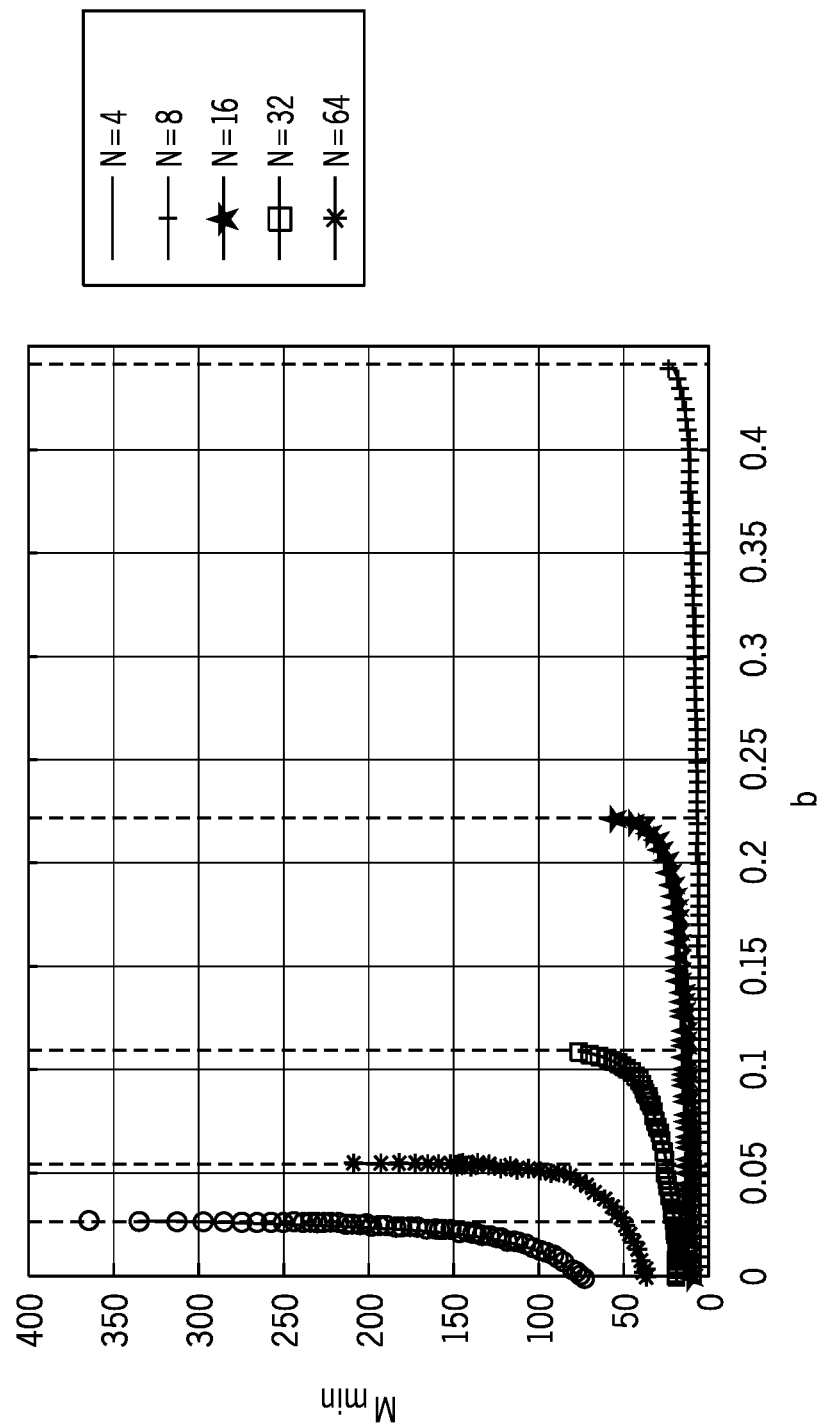
FIG. 23 illustrates examples of the minimum codebook size M min as a function of fractional bandwidth b for $\psi m=1$, where the maximum targeted covers AoA/AoD of the codebook is 90°, in accordance with various examples.

FIG. 23 illustrates examples of the minimum codebook size M_min as a function of fractional bandwidth b for ψm=1, where the maximum targeted AoA/AoD of the codebook is 90°. b=0 is equivalent to not considering beam squint. The dashed lines indicate upper bounds.

Figure 24:
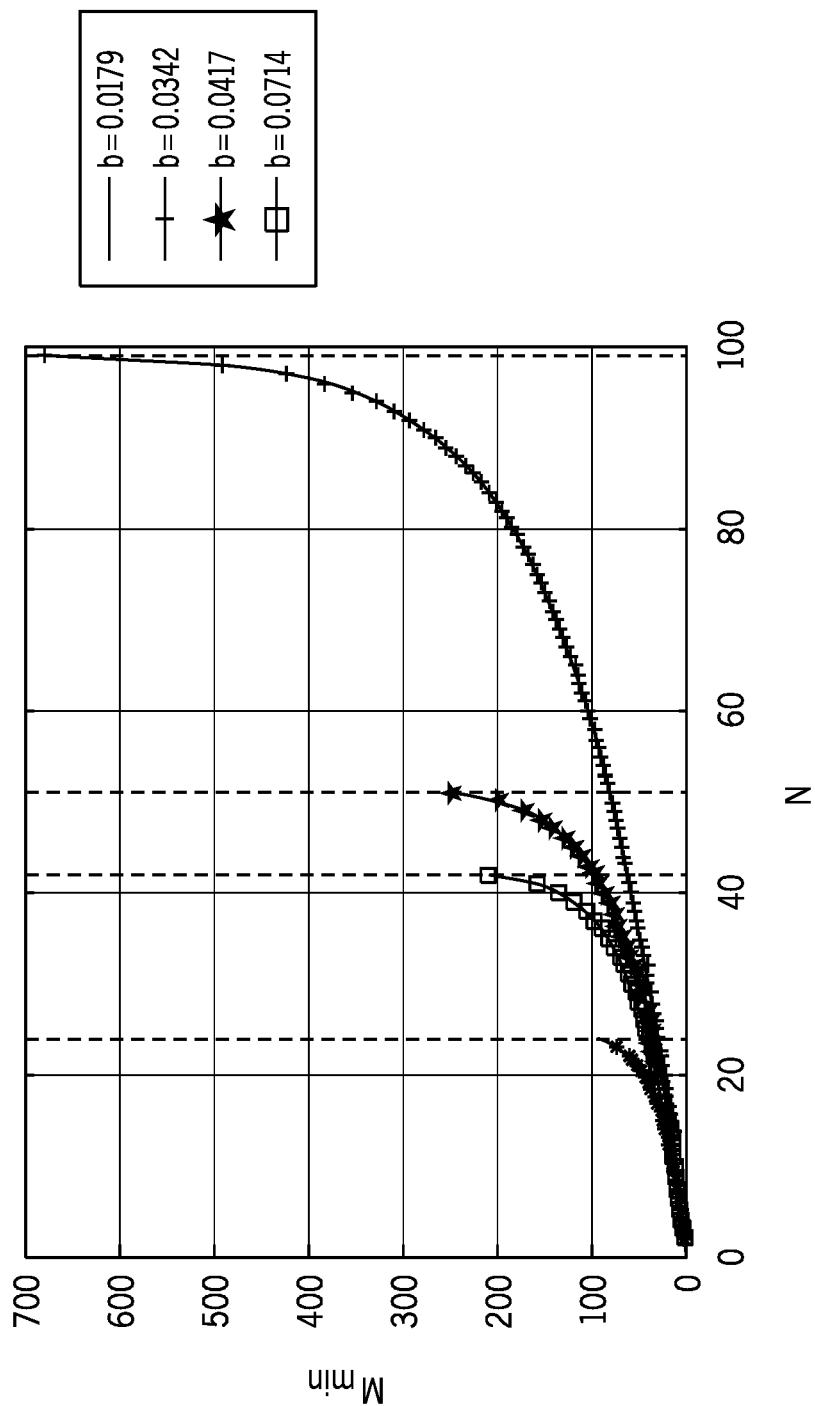
FIG. 24 illustrates the minimum codebook M min required to cover $\psi \varepsilon[-1, 1]$ as a function of the number of antennas N, in accordance with various examples.

FIG. 24 illustrates the minimum codebook M_min required to cover ψε[−1, 1] as a function of the number of antennas N. The dashed lines indicate the upper bounds.

What is claimed is:

1. A method of managing beam squint, comprising:
    determining a minimum array gain threshold;
    determining an upper bound for a fractional bandwidth for a fixed number of antennas;
    constructing a codebook with a predetermined coverage range:
        based on at least one of an angle of arrival or an angle of departure and
        further based on the upper bound;
    performing carrier aggregation for the fixed number of antennas; and
    selecting at least two antennas based on the codebook.

2. The method of claim 1, further comprising
    determining a magnitude of a beam focus angle; and
    determining a critical band separation.

3. The method of claim 1, wherein the carrier aggregation is determined based on beam squint on either a transmitter or a receiver side.

4. The method of claim 3, wherein the carrier aggregation is determined based on beam squint on both of a transmitter or a receiver side.

5. The method of claim 3, wherein the at least two antennas are a phased array.

6. The method of claim 5, wherein the phased array is a uniform linear array.

7. The method of claim 5, wherein the phased array is a uniform planar array.

8. The method of claim 1, wherein multiple bands are selected for carrier aggregation.

9. The method of claim 8, wherein the multiple bands selected for carrier aggregation are contiguous.

10. The method of claim 8, wherein the multiple bands selected for carrier aggregation are non-contiguous.

11. The method of claim 1, wherein codebook size is correlated with the minimum array gain threshold.

12. The method of claim 1, wherein the at least two antennas operate at millimeter wavelengths.

13. An apparatus for managing beam squint, comprising:
    an antenna group, in communication with a transmitter and receiver;
    a frequency phase shifter in communication with each antenna in the antenna group, the phase shifter acting in concert in response to commands;
    a memory in communication with the antenna group; and
    a processor coupled to the memory and configured to:
        select antennas from the group of antennas based on a codebook stored in the memory, the codebook configured to perform carrier aggregations; and
        issue commands to the antenna group.

14. The apparatus of claim 13, wherein the antenna group is a millimeter wavelength antenna group.

15. The apparatus of claim 13, wherein each antenna in the antenna group is in one-to-one communication with one of a group of frequency phase shifters.

16. A non-transitory computer-readable medium comprising instructions stored thereon, which when performed by a processor, cause the processor to:
  determine a minimum array gain threshold;
  determine an upper bound for a fractional bandwidth for a fixed number of antennas;
  construct a codebook with a predetermined coverage range:
    based on at least one of an angle of arrival or an angle of departure and
    further based on the upper bound;
  perform carrier aggregation for the fixed number of antennas; and
  select at least two antennas based on the codebook.

17. The non-transitory computer-readable medium of claim 16, wherein codebook size is correlated with the minimum array gain threshold.

18. The non-transitory computer-readable medium of claim 16, wherein the at least two antennas are controlled by instructions from a codebook, and a set of instructions controls the group of antennas.

19. The non-transitory computer-readable medium of claim 16, wherein the at least two antennas are a phased array.

20. The non-transitory computer-readable medium of claim 19, wherein the phased array is a uniform linear array.

21. The non-transitory computer-readable medium of claim 19, wherein the phased array is a uniform planar array.

22. The non-transitory computer-readable medium of claim 16, wherein the at least two antennas operate at millimeter wavelengths.

23. The non-transitory computer-readable medium of claim 16, wherein the instructions further cause the processor to select the codebook from a group of codebooks.

24. The non-transitory computer-readable medium of claim 16, wherein the instructions further cause the processor to:
  determine a magnitude of a beam focus angle; and
  determine a critical band separation.

* * * * *